US011494146B2

(12) United States Patent
Kikuchi

(10) Patent No.: US 11,494,146 B2
(45) Date of Patent: Nov. 8, 2022

(54) INFORMATION PROCESSING APPARATUS CREATES VIRTUAL PRINTER TO TRANSMIT PRINT JOB TO ASSOCIATED IMAGE FORMING APPARATUS WHICH SUPPORTS PREDETERMINED PRINT FORMAT

(71) Applicant: CANON KABUSHIKI KAISHA, Tokyo (JP)

(72) Inventor: Hiroshi Kikuchi, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/895,939

(22) Filed: Jun. 8, 2020

(65) Prior Publication Data

US 2020/0394008 A1 Dec. 17, 2020

(30) Foreign Application Priority Data

Jun. 12, 2019 (JP) .............................. JP2019-109412

(51) Int. Cl.
*H04N 1/00* (2006.01)
*G06F 3/12* (2006.01)
*G06F 3/06* (2006.01)

(52) U.S. Cl.
CPC ....... *G06F 3/1296* (2013.01); *H04N 1/00244* (2013.01); *H04N 1/00411* (2013.01); *G06F 3/0662* (2013.01); *G06F 3/0667* (2013.01)

(58) Field of Classification Search
None
See application file for complete search history.

(56) References Cited

U.S. PATENT DOCUMENTS

| 6,535,295 B1* | 3/2003 | Brossman | G06F 3/1207 |
| | | | 358/1.15 |
| 2010/0188700 A1* | 7/2010 | Fujimori | G06F 3/1256 |
| | | | 358/1.15 |
| 2011/0302575 A1* | 12/2011 | Hasama | G06F 3/1204 |
| | | | 358/1.15 |
| 2014/0300914 A1* | 10/2014 | Yamazaki | G06F 3/1285 |
| | | | 358/1.13 |
| 2014/0327936 A1* | 11/2014 | Busch | G06F 3/1292 |
| | | | 358/1.15 |
| 2014/0355063 A1* | 12/2014 | Jang | G06F 3/1205 |
| | | | 358/1.15 |
| 2015/0220815 A1* | 8/2015 | Akiyama | G06F 3/1256 |
| | | | 358/1.15 |

(Continued)

FOREIGN PATENT DOCUMENTS

JP 2016-110520 A 6/2016

*Primary Examiner* — Haris Sabah
(74) *Attorney, Agent, or Firm* — Canon U.S.A., Inc. I.P. Division

(57) ABSTRACT

An information processing apparatus includes a processor and a memory storing instructions. Executing the instructions by the processor causes the processor to perform operations. A virtual device on the information processing apparatus to transmit a print job to an image forming apparatus is selected. A user interface is displayed that is for activating, in accordance with the selected virtual device and among one or more applications to provide an additional function to the image forming apparatus, an application that corresponds to a model of the image forming apparatus to which the selected virtual device transmits the print job.

19 Claims, 20 Drawing Sheets

(56) References Cited

U.S. PATENT DOCUMENTS

| | | | |
|---|---|---|---|
| 2015/0261486 A1* | 9/2015 | Shindoh | G06K 15/1815 |
| | | | 358/1.15 |
| 2017/0024170 A1* | 1/2017 | Li | G06F 3/1228 |
| 2017/0163835 A1* | 6/2017 | Okazawa | H04N 1/00973 |

* cited by examiner

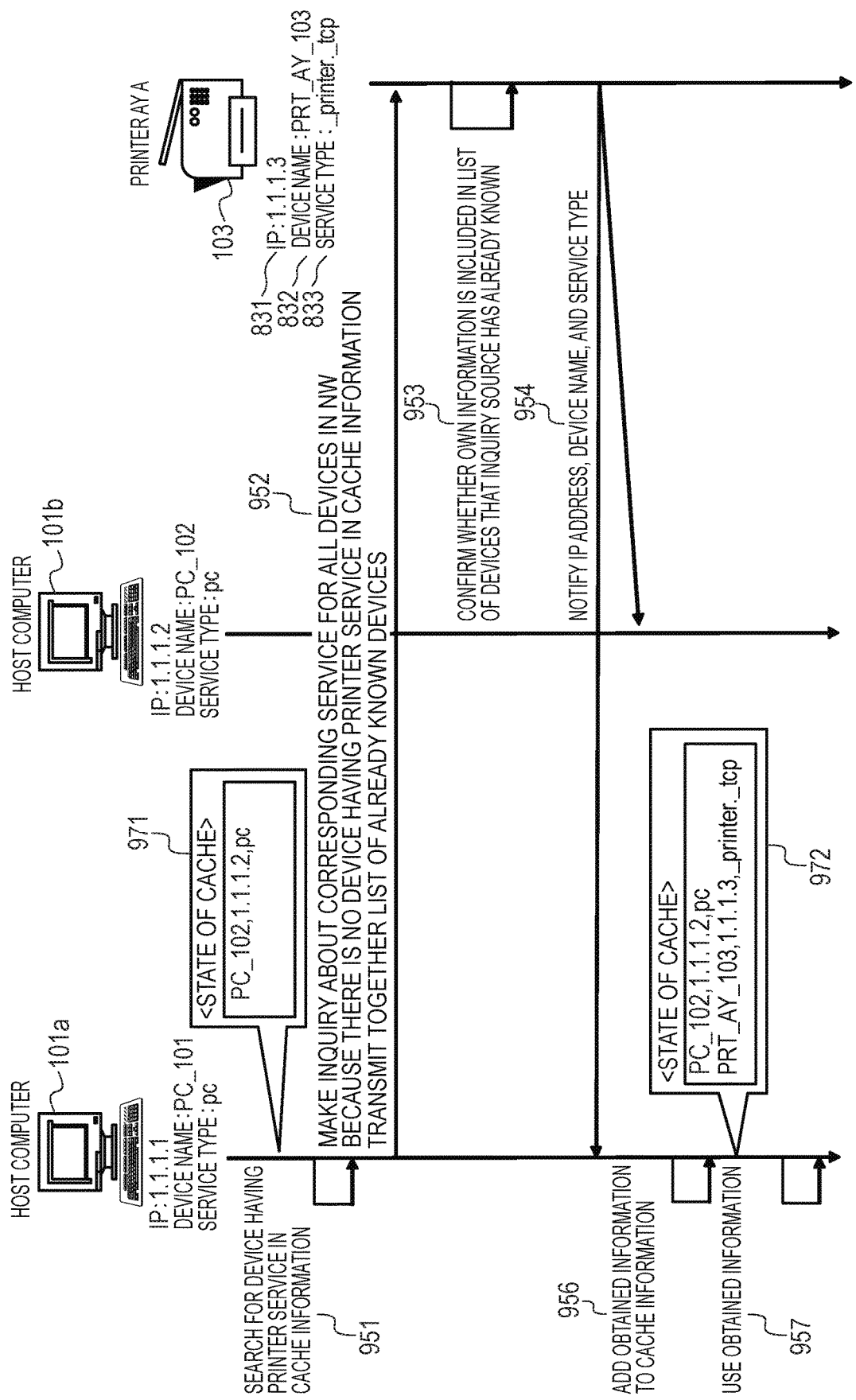

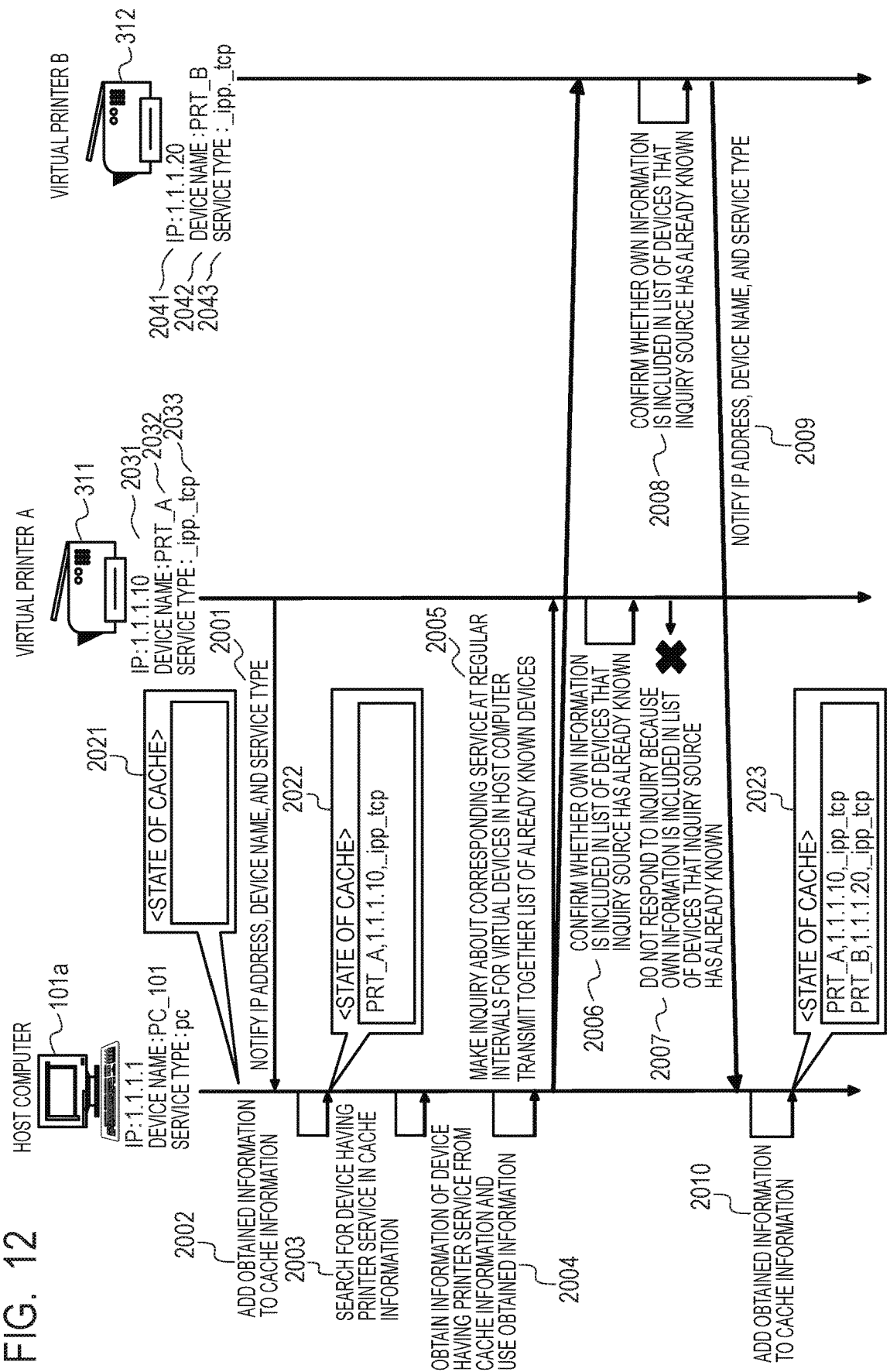

FIG. 14

```
VirtualPrinterService.app                    ~1201
└ Contents                                   ~1202
    ├ Application                            ~1203
    │   ├ Virtual Printer Service            ~1204
    │   └ Driver                             ~1205
    │       └ Utilities                      ~1206
    │           ├ PrinterUtility.app         ~1207
    │           ├ StatusMonitor.app          ~1208
    │           └ AutoShutdownTool.app       ~1209
    └ Resources                              ~1210
        ├ Driver                             ~1211
        │   └ Icons                          ~1212
        └ PPDs                               ~1213
            ├ PrinterAY.ppd                  ~1214
            ├ PrinterBZ.ppd                  ~1215
            └ PrinterCX.ppd                  ~1216
```

INFORMATION PROCESSING APPARATUS CREATES VIRTUAL PRINTER TO TRANSMIT PRINT JOB TO ASSOCIATED IMAGE FORMING APPARATUS WHICH SUPPORTS PREDETERMINED PRINT FORMAT

BACKGROUND

Field

The present disclosure relates to an application for managing a virtual device that transmits a print job to an image forming apparatus, and an information processing apparatus.

Description of the Related Art

In order to use a peripheral apparatus such as an image forming apparatus or the like from an information processing apparatus, generally a specific device driver corresponding to the peripheral apparatus is installed in an operation system (OS) operating on the information processing apparatus. Namely, for the image forming apparatus, a printer driver is installed on the information processing apparatus and used.

In use of the image forming apparatus, the printer driver is activated from an application, a setting necessary for printing is performed, image data and a print setting (hereinafter collectively referred to as a "print job") are generated, and the generated print job is transmitted from the information processing apparatus to the image forming apparatus. The image forming apparatus that has received the print job performs an image generation process according to the print setting, and then performs printing on paper.

The printer driver mainly includes a user interface (UI) module, a print job generation module, and a communication module. The UI module manages an input from a user or the application, the print job generation module generates the print job, and the communication module controls a communication process between the information processing apparatus and the image forming apparatus.

The printer driver including these modules receives print data from the OS, and transmits the print job generated by the print job generation module to the image forming apparatus.

Further, there is a utility application (hereinafter referred to as "utility") that provides various additional functions to the user when using the image forming apparatus. As well as the printer driver, the utility is provided by a vendor of the image forming apparatus. For example, there are the utilities such as a utility for displaying the current state of the image forming apparatus (hereinafter, referred to as a "status monitor"), a utility for automatically shutting down the image forming apparatus (hereinafter, referred to as an "auto-shutdown tool"), and the like. In addition, a tool for displaying printer information, a function of accessing a Web server function of the image forming apparatus by a HyperText Transfer Protocol (HTTP) (hereinafter, referred to as a "remote user interface or "remote UI"), and the like are provided as the utilities.

On the other hand, in recent years, a printing system that enables printing without using a printer driver by using a specific protocol has been introduced in the OS. For example, the printing system corresponding to AirPrint™ of Apple Inc., Android™ of Google Inc., Mopria™ of Windows™ of Microsoft Inc., and the like have been introduced. In such cases, there is no need to install a printer driver corresponding to the image forming apparatus in the OS, and the OS performs all print job generation and print job transmission to the image forming apparatus (Japanese Patent Application Laid-Open No. 2016-110520). Incidentally, it should be noted that the AirPrint™ is a partial function of the OS.

However, an image forming apparatus that does not correspond to the printing system in the OS that enables printing without using the printer driver cannot interpret a print job even when receiving the print job from the OS. In view of this, a virtual image forming apparatus (hereinafter referred to as a "virtual device") capable of receiving a print job from the OS may be created in the information processing apparatus, and the information processing apparatus causes the created virtual device to transmit the received print job to the image forming apparatus.

In a printing system that uses a printer driver, utility information is described in a printer driver configuration file (e.g., a PostScript Printer Description (PPD) file), for each model of image forming apparatus. Therefore, the user can activate a utility corresponding to a model from a standard UI of the printing system of the OS. Here, the PPD file is a file in which specifications of a printer are described. In the PPD file, for example, a printer name, a paper size, . . . , other special function information (e.g., the above utility information), and the like are described.

However, in the printing system that does not use a printer driver, the utility cannot be activated from a standard UI displayed by the OS. Generally, the utility is different for each model. In the printing system that does not use the printer driver, a different utility cannot be activated for each model because there is no printer driver configuration file for each model of image forming apparatus. That is, in the printing system that does not use the printer driver, the user cannot use a different utility for each model of image forming apparatus.

SUMMARY

According to an aspect of the present disclosure, an information processing apparatus includes a processor and a memory storing instructions that, when the instructions are executed by the processor, cause the processor to perform operations including selecting a virtual device on the information processing apparatus configured to transmit a print job to an image forming apparatus, and displaying a user interface for activating, in accordance with the selected virtual device among one or more applications configured to provide an additional function to the image forming apparatus, an application that corresponds to a model of the image forming apparatus to which the selected virtual device transmits the print job.

Further features of the present disclosure will become apparent from the following description of exemplary embodiments with reference to the attached drawings.

BRIEF DESCRIPTION OF THE DRAWINGS

FIG. 11 is a sequence diagram of a device search process on the network.

FIG. 12 is a sequence diagram of a virtual printer search process in the host computer.

FIG. 14 is a diagram for describing an example of a file configuration of the virtual printer service.

DESCRIPTION OF THE EMBODIMENTS

First Embodiment

Figure 1:
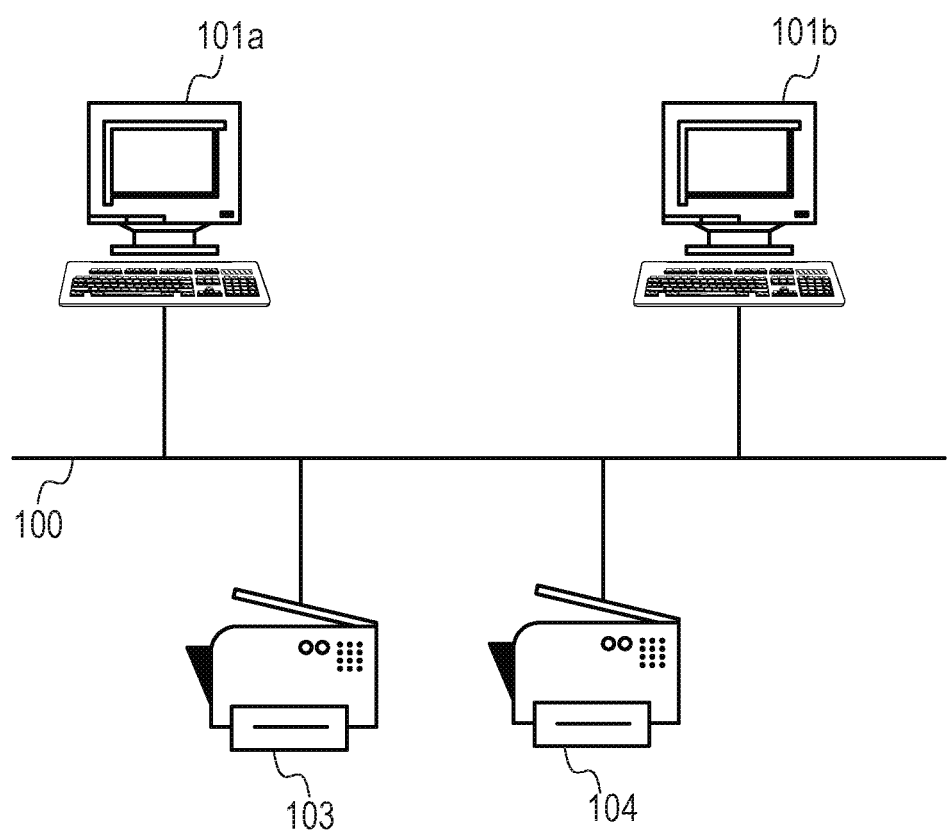
FIG. 1 is a diagram for describing an example of an overall configuration of a printing system according to an embodiment.

FIG. 1 is a diagram for describing an example of an overall configuration of a printing system according to one embodiment of the present disclosure.

The system according to the present embodiment includes host computers 101a and 101b and printers 103 and 104.

Each of the host computers 101a and 101b is an example of an information processing apparatus such as a personal computer (PC) or the like. Each of the printers 103 and 104 is an image forming apparatus that receives print data in a page description language (PDL) format or a raster format, and prints the received print data.

These apparatuses can communicate with others via a network 100. The network 100 is, for example, a local area network (LAN) or an intranet, and can include a wide area network (WAN).

Incidentally, each of the printers 103 and 104 may be a single function printer that has only a printing function, or a multifunction printer that has a printing function, a scanning function and a copying function.

Besides, one or three or more host computers and printers may be connected to the network 100.

Incidentally, in the following description, to make a common explanation for the host computers 101a and 101b, suffixes such as "a" and "b" may be omitted and the host computers 101a and 101b may be referred to as a host computer 101. In addition, respective constituent elements of these computers, such as elements 210a, 210b, 211a, 211b, 212a, 301a, 301b, 302a, 302b, 303a, and 303b, may also be described with the suffixes "a" and "b" omitted.

Figure 2:
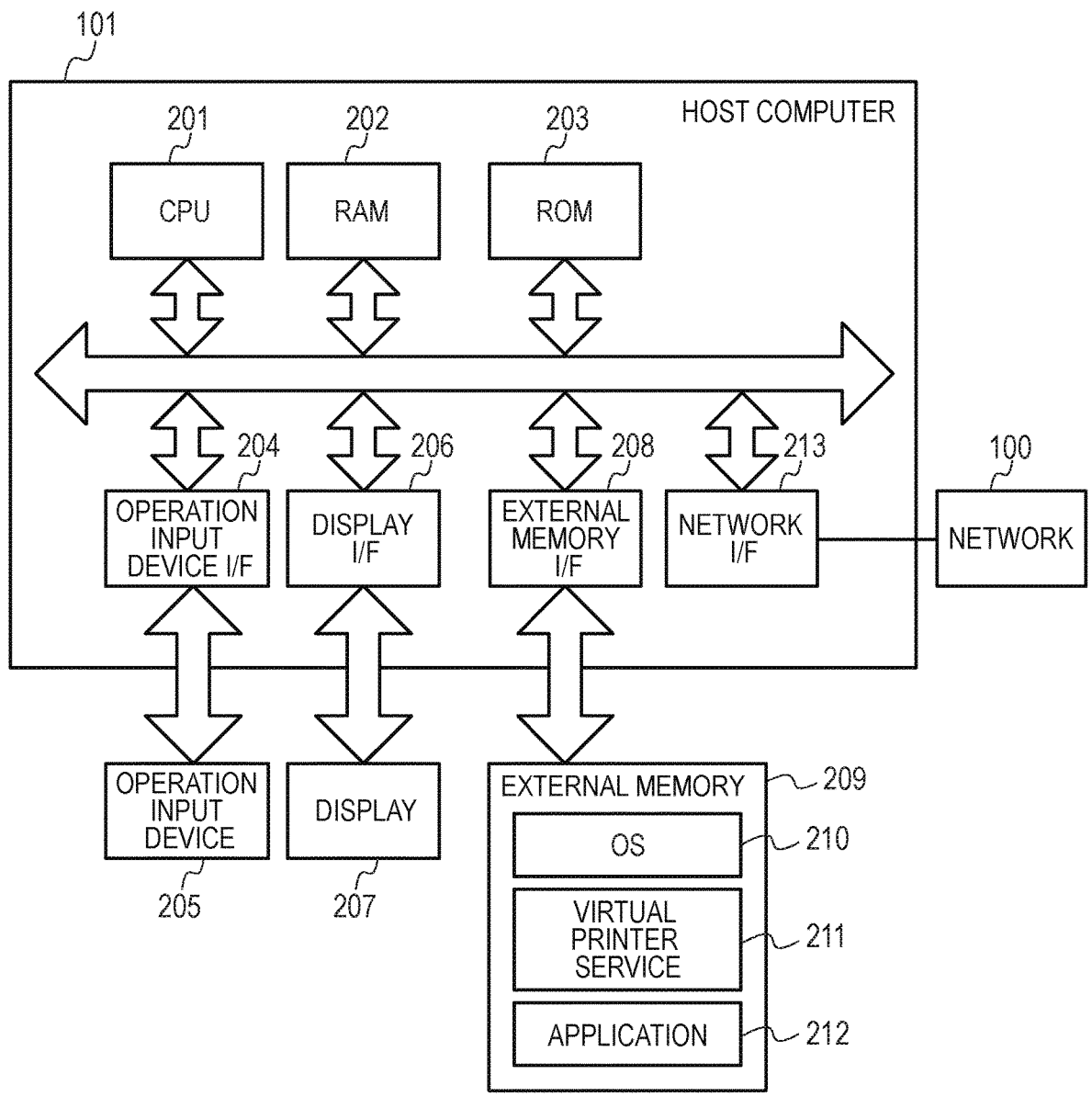
FIG. 2 is a block diagram for describing a hardware constitution of an information processing apparatus capable of constituting a host computer.

FIG. 2 is a block diagram for describing an example of a hardware constitution of the information processing apparatus that can constitute the host computer 101.

A control unit including a central processing unit (CPU) 201 controls the operation of the entire host computer 101. The CPU 201 extracts a program stored in a read only memory (ROM) 203 or an external memory 209 into a random access memory (RAM) 202 and executes the extracted program, thereby performing various kinds of control such as UI screen control, print data generation control, print data transfer control and the like.

The RAM 202 is a main storage memory of the CPU 201, and is used as a work area or a temporary storage area for extracting various programs. The ROM 203 is used to store a control program, a boot program and the like executable by the CPU 201. An external memory interface (I/F) 208 is an interface for connecting the external memory 209 to the control unit. The external memory 209 is used to store an OS 210, a virtual printer service 211, an application 212 and the like.

In the present embodiment, although an auxiliary storage device such as a hard disk drive (HDD) or the like is assumed as the external memory 209, a nonvolatile memory such a solid state drive (SSD) or the like may be used instead of or in combination with the HDD. As just described, the hardware including the CPU 201, the RAM 202, the ROM 203, the external memory 209 and the like constitutes a so-called computer.

An operation input device I/F 204 is an interface for controlling an operation input device 205 such as a keyboard, a pointing device such as a mouse, a touch input device or the like. The operation input device 205 functions as an accepting unit that accepts an operation from a user.

A display I/F 206 controls screen display on a display 207. The display 207 functions as a displaying unit that displays information to the user.

The host computer 101 is connected to the network 100 via a network I/F 213. The network I/F 213 performs transmission of print data to the printers 103 and 104 on the network 100, and performs communication on the Internet. Incidentally, data communication with an external terminal on the network 100 is, for example, wireless communication conforming to the IEEE 802.11 series or communication via a wired cable such as a LAN cable.

Incidentally, the OS 210, the virtual printer service 211 described later, the application 212 and the like have been installed in the external memory 209 of the host computer 101 according to the present embodiment. Such software functions by loading programs stored in the ROM 203 or the external memory 209 into the RAM 202 and executing the loaded programs by the CPU 201, thereby realizing software functions described below.

Figure 3:
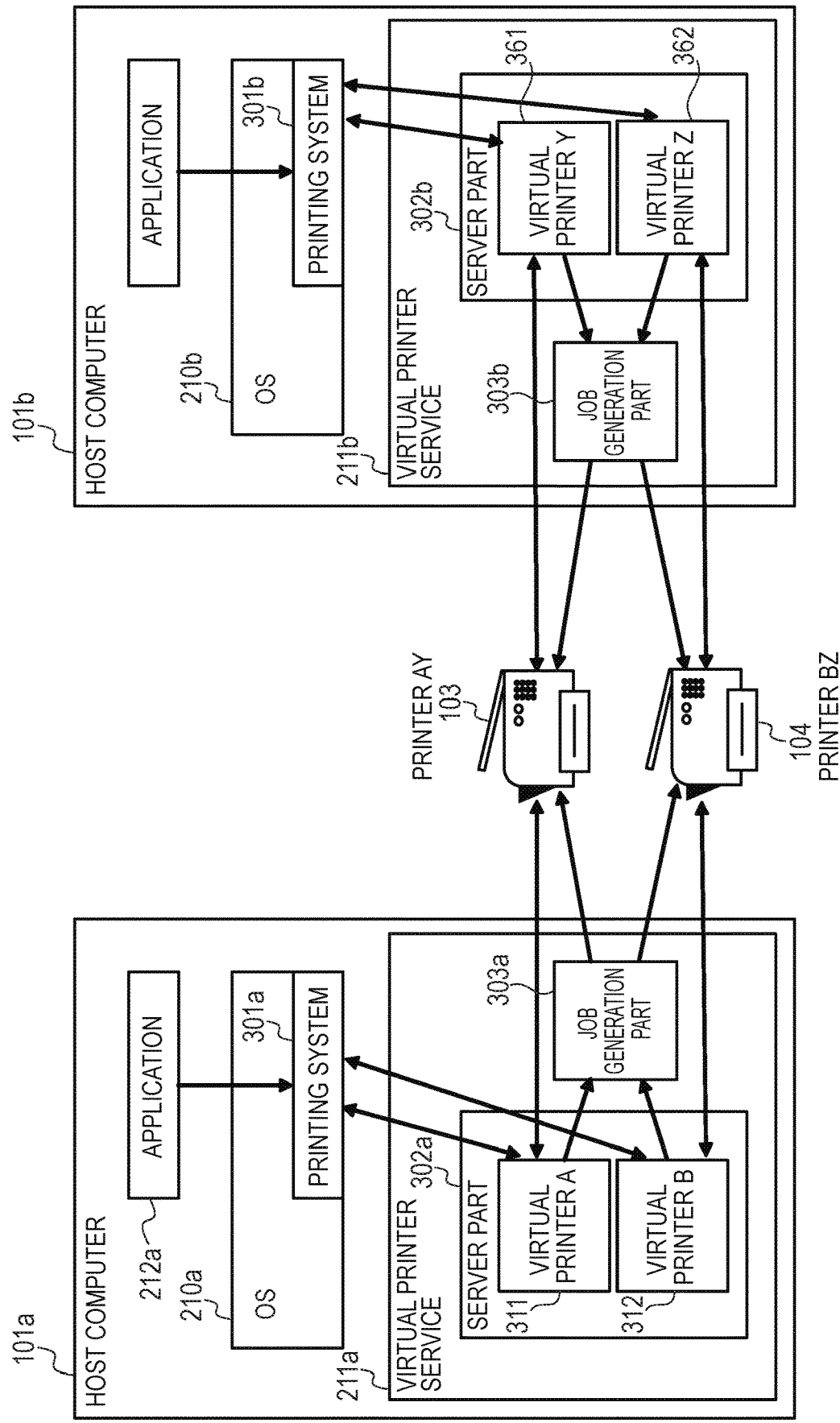
FIG. 3 is a block diagram for describing software configurations of the host computers.

FIG. 3 is a block diagram for describing software configurations of the host computers 101a and 101b.

One of functions of an OS 210a installed in the host computer 101a is a printing system 301a. The printing system 301a controls a printing operation from the host computer 101a. The printing system 301a is a printing system that allows printing without using a printer driver, by using a specific protocol. For example, the printing system 301a is the printing system that corresponds to AirPrint™ of Apple Inc., Android™ of Google Inc., Mopria™ of Windows™ of Microsoft Corporation, or the like.

A virtual printer service 211a has a job generation part 303a and a server part 302a.

A virtual printer A 311 and a virtual printer B 312 are generated in the server part 302a. In this example, the virtual printer A 311 is generated in association with the printer AY 103 that is a real printer. Similarly, the virtual printer B 312 is generated in association with the printer BZ 104 that is a real printer.

In the present embodiment, a printer that is created in the host computer 101 by the virtual printer service 211 and responds to a predetermined search protocol like a real printer is referred to as a virtual printer (e.g., the virtual printer A 311, the virtual printer B 312, or the like). The virtual printer receives print data according to a specific protocol, creates or converts the print data, and transmits the created or converted print data to the real printer. Incidentally, the main body of the real printer (e.g., the printer AY 103, the printer BZ 104, or the like) is referred to as the real printer.

Each of the virtual printer A 311 and the virtual printer B 312 receives a printer search request (device search request) using the predetermined search protocol from the OS 210a, and then returns printer information in accordance with the search protocol. Besides, the virtual printers A 311 and B 312 perform communication, such as detecting the respective states of the associated printers AY 103 and BZ 104, using the search protocol. In the present embodiment, a description will be given using Bonjour™ protocol of Apple Inc. as an example as the search protocol supported by the OS 210 of the host computer 101. In the Bonjour™ protocol, a Multicast Domain Name System (DNS) technique is used for device search. Incidentally, the search protocol is not limited to the Bonjour™ protocol, but may be another protocol having the similar function.

The virtual printer A 311 (virtual printer B 312) receives a print job from the printing system 301a of the OS 210 that has registered the virtual printer A 311 (virtual printer B 312) as a destination of the print job based on the response to the search request. The virtual printer A 311 (virtual printer B 312) converts the received print job into a predetermined format capable of being interpreted by the job generation part 303a, and transmits the converted print job to the job generation part 303a. The job generation part 303a has a role of generating a print job in a format capable of being processed by the real printer (the printer AY 103, the printer BZ 104) for the print job received by each virtual printer from the printing system 301a, and transmitting the generated print job to the real printer. Incidentally, the function of a job generation part 303 may be included in the virtual printer. That is, the virtual printer may generate a print job capable of being processed by the real printer from the received print job, and transmit the generated print job to the real printer.

The host computer 101b has the same configuration as that of the host computer 101a. That is, one of functions of an OS 210b installed in the host computer 101b is a printing system 301b. The printing system 301b controls a printing operation from the host computer 101b. A virtual printer service 211b has a job generation part 303b and a server part 302b. A virtual printer Y 361 and a virtual printer Z 362 are generated in the server part 302b. In this example, the virtual printer Y 361 is generated in association with the printer AY 103 that is a real printer. Similarly, the virtual printer Z 362 is generated in association with the printer BZ 104 that is a real printer.

Incidentally, the virtual printer is also called a virtual device, and the virtual printer service is also called a virtual device service.

Figure 4:
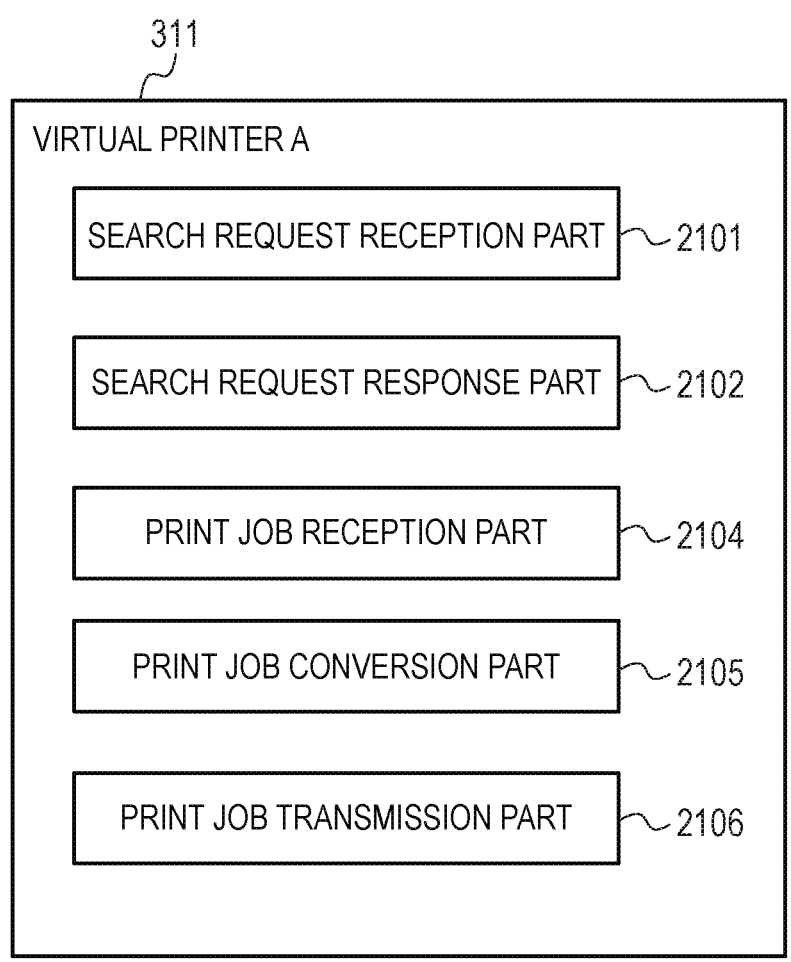
FIG. 4 is a block diagram for describing a software configuration of a virtual printer.

FIG. 4 is a block diagram for describing an example of a software configuration of the virtual printer. Here, although the virtual printer A 311 is illustrated as an example in FIG. 4, the same applies to other virtual printers.

The virtual printer according to the present embodiment includes a search request reception part 2101, a search request response part 2102, a print job reception part 2104, a print job conversion part 2105, and a print job transmission part 2106.

The search request reception part 2101 receives the printer search request according to the Bonjour™ protocol.

The search request response part 2102 returns (responds) printer information to the printer search request in accordance with the Bonjour™ protocol.

Incidentally, the search request reception part 2101 and the search request response part 2102 respond only to the search request using the Bonjour™ protocol.

The print job reception part 2104 receives the print job from the printing system 301a using a specific protocol. For example, the print job reception part 2104 receives the print job that is generated when a file being the source of the print job is opened by an application 212a in the host computer 101a and a user gives a print instruction on the application. The application 212a includes, for example, various applications operable on the OS 210a, such as a word processor application, a spreadsheet application, a Web browser application, an image editing application and the like.

The print job conversion part 2105 converts the print job received by the print job reception part 2104 into a format capable of being recognized by the job generation part 303a. Incidentally, the format capable of being recognized by the job generation part 303a is, for example, a Portable Document Format (PDF), but is not limited thereto.

The print job transmission part 2106 transmits the print job converted by the print job conversion part 2105 to the job generation part 303a.

Figure 5A:
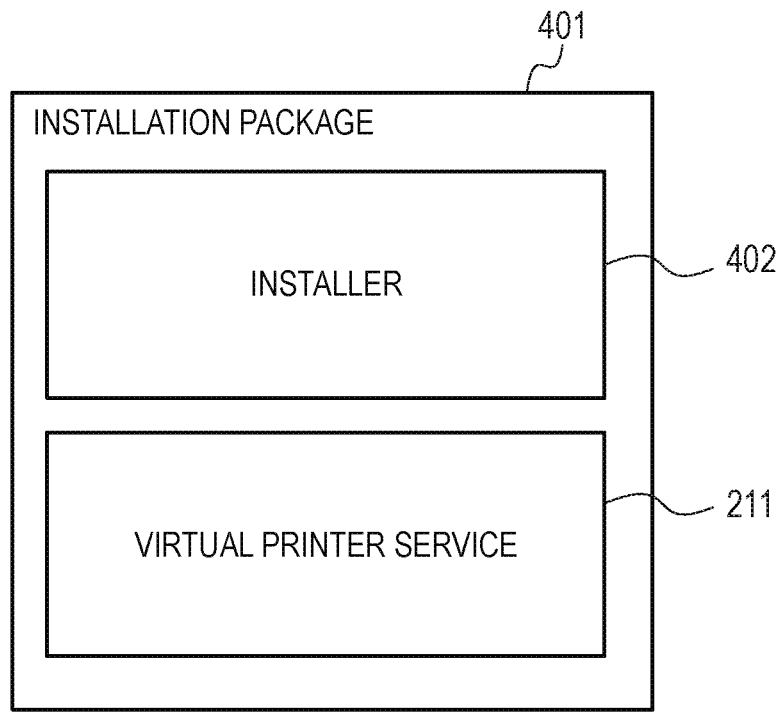
FIGS. 5A and 5B are diagrams for respectively describing a software configuration of an installation package of a virtual printer service and an installation process of the virtual printer service.

FIG. 5A is a block diagram for describing an example of a software configuration of an installation package for installing the virtual printer service.

An installation package 401 includes an installer 402 and the virtual printer service 211. When the installation package 401 is executed on the host computer 101, the installer 402 operates to perform an installation process of installing the virtual printer service 211 to the host computer 101. By the installation process, the virtual printer service 211 is stored in the external memory 209 of the host computer 101, loaded into the RAM 202 when a program is executed, and executed by the CPU 201. Incidentally, the virtual printer service 211 is an application program and can generate the plurality of virtual printers.

Figure 5B:
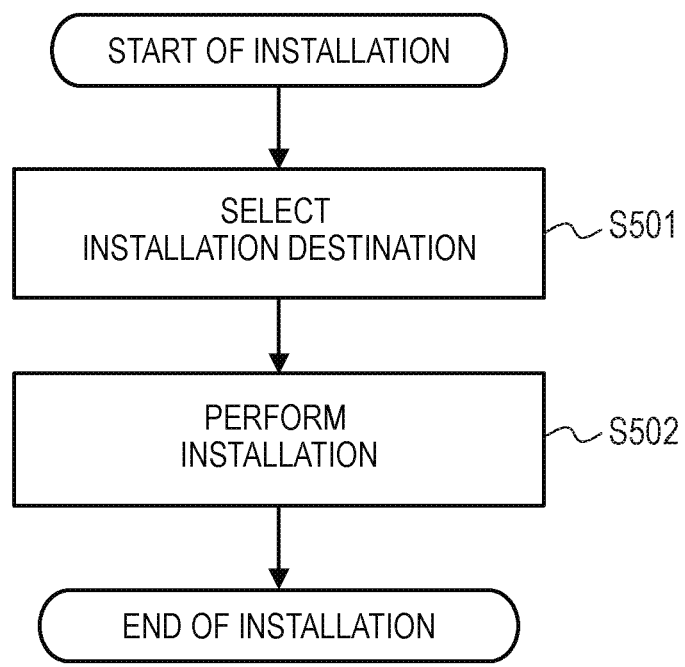

FIG. 5B is a flowchart for describing an example of the installation process of the virtual printer service 211. The installation process is started, for example, by executing the installation package 401 of the virtual printer service downloaded from a predetermined website (or recorded on a recording medium such as a CD-ROM) on the OS 210 of the host computer 101.

In S501, the installer 402 included in the installation package 401 performs a selection process of selecting an installation destination of the virtual printer service. The installer 402 displays a not-illustrated installation destination selection screen on the display 207 of the host computer 101, and obtains installation destination information input by a user on the installation destination selection screen. On the installation destination selection screen, for example, a message such as "PLEASE SELECT DISK ON WHICH VIRTUAL PRINTER SERVICE IS TO BE INSTALLED" is displayed to prompt the user to select the external memory on which the virtual printer service is to be installed.

Next, in S502, the installer 402 installs the virtual printer service 211 to the host computer 101. The installation destination is a location according to the installation destination information obtained in S501. The installed virtual printer service 211 is executed and activated by the OS 210. In a case where no virtual printer has been generated when the virtual printer service 211 is activated, a main UI (FIG. 7A described later) of the virtual printer service 211 is displayed. Incidentally, the main UI can be displayed also by a user operation. When the main UI of the virtual printer service 211 (FIG. 7A described later) is displayed, the virtual printer service 211 starts a virtual printer generation process in FIG. 6.

Figure 6:
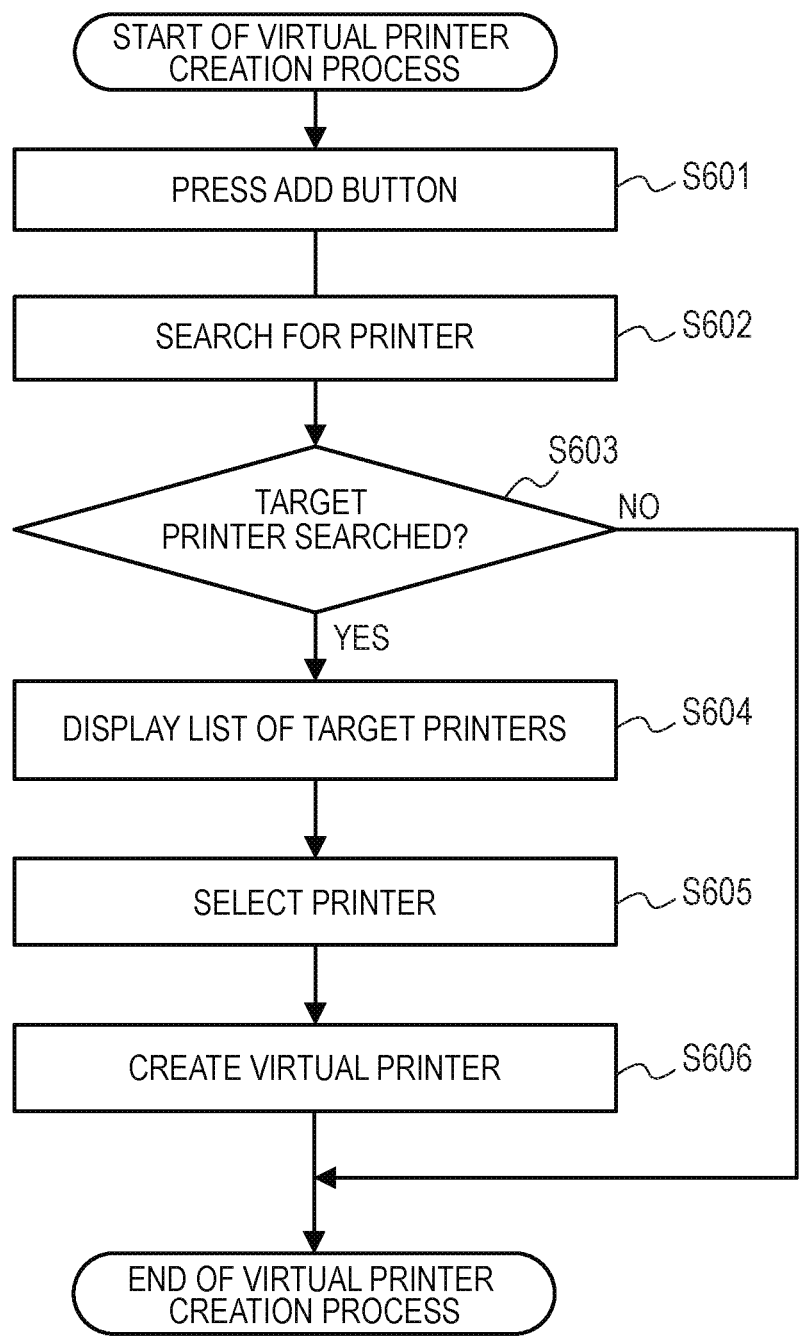
FIG. 6 is a flowchart for describing an example of a virtual printer generation process according to a first embodiment.

FIG. 6 is the flowchart for describing an example of the virtual printer generation process according to the first embodiment. The process of this flowchart is performed by the virtual printer service 211.

In S601, the virtual printer service 211 detects that an add button is pressed by the user on the main UI. Here, the add button is a "+" (plus) button 1004 illustrated in later-described FIG. 7A. Upon detecting that the "+" button 1004 is pressed, the virtual printer service 211 displays a virtual printer addition screen illustrated in later-described FIG. 7B, and advances the process to S602. Here, the UI of the virtual printer service 211 will be described with reference to FIGS. 7A and 7B.

Figure 7A:
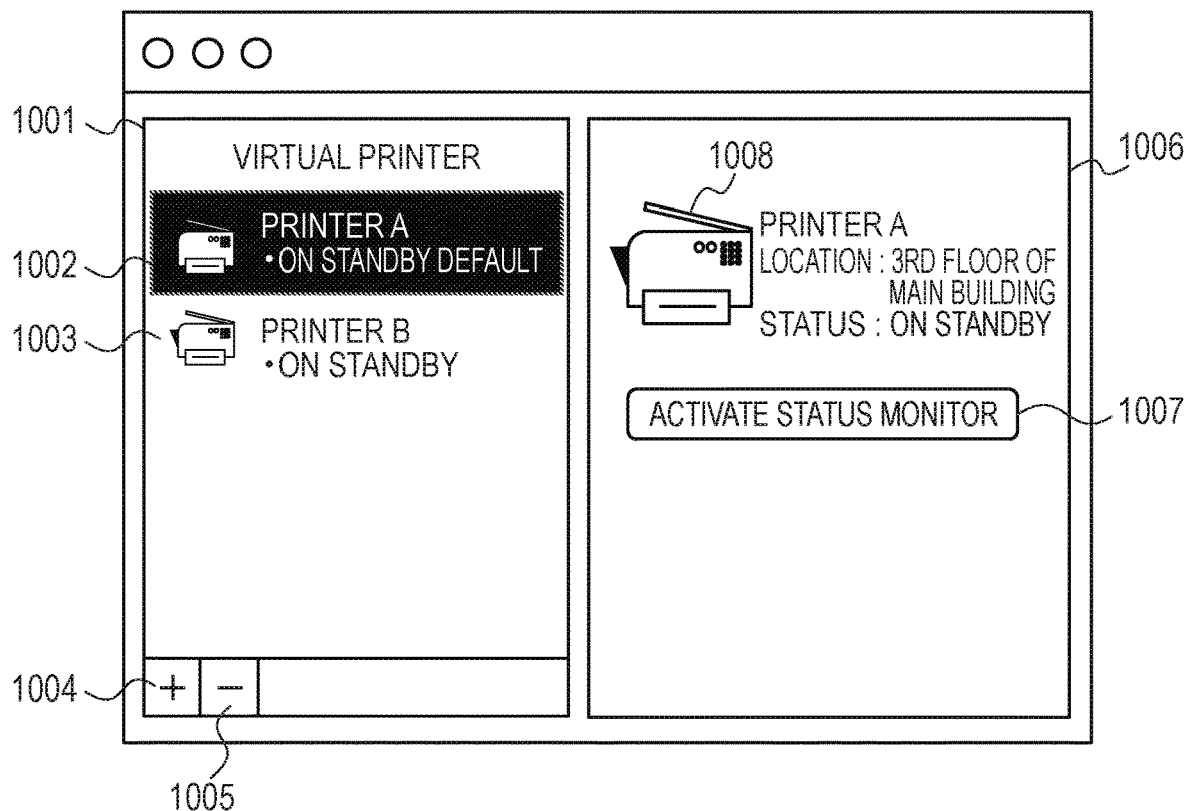
FIGS. 7A and 7B are views for describing examples of a UI of the virtual printer service.
Figure 7B:
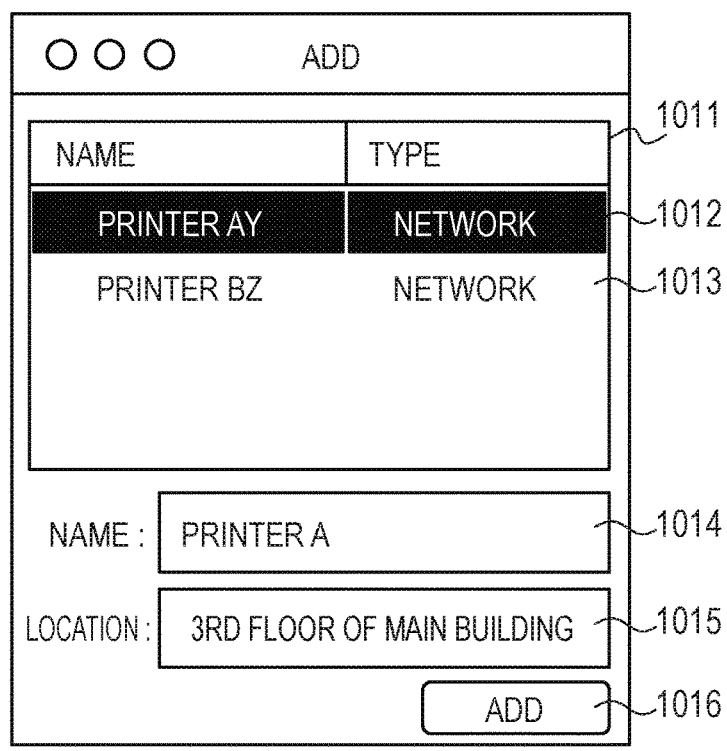

FIGS. 7A and 7B are the views for describing examples of the UI of the virtual printer service 211. The UI of the virtual printer service 211 is displayed on the display 207 of the host computer 101 on which the virtual printer service 211 has been activated.

FIG. 7A shows the example of the main UI of the virtual printer service.

In FIG. 7A, in a printer list area 1001, a list of virtual printers created by the server part 302 is listed. The example of FIG. 7A shows the UI in a state that two virtual printers (printer A and printer B) have already been registered.

In an area 1002, the icon, name, and status of the virtual printer A 311 are displayed. Similarly, in an area 1003, the icon, name, and status of the virtual printer B 312 are displayed. Incidentally, since the virtual printer service 211 immediately after the installation is in a state that no virtual printer has been generated, no virtual printer is listed in the printer list area 1001.

The user can add a virtual printer by pressing the "+" (plus) button 1004. The UI in the case where the "+" button 1004 is pressed will be described later with reference to FIG. 7B. Besides, by pressing a "−" (minus) button 1005, the virtual printer selected in the printer list area 1001 can be deleted.

Besides, in an area 1006, more detailed information of the virtual printer selected in the printer list area 1001 is displayed. More specifically, an icon 1008 representing the printer, and the name, location and status of the printer, and the like are displayed. Further, by pressing an "ACTIVATE STATUS MONITOR" button 1007, the status of the printer AY 103 can be displayed in more detail.

FIG. 7B shows the example of the UI (virtual printer addition screen) displayed when the "+" button 1004 of FIG. 7A is pressed. In an area 1011 of FIG. 7B, a list of printers supported by the virtual printer service 211 among printers existing on the network to which the host computer 101 is connected and universal serial bus (USB) connected printers is listed. In this example, the printer AY 103 and the printer BZ 104 connected to the network 100 are displayed in an area 1012 and an area 1013, respectively. The user selects the printer for which the virtual printer is to be created from this list, inputs a name 1014 and a location 1015, and presses an add button 1016. Thus, the UI returns to that shown in FIG. 7A, and a virtual printer name of the added virtual printer (i.e., a name input by the name 1014) is added to the printer list area 1001 and displayed.

Here, the description returns to the flowchart of FIG. 6.

In S602, the virtual printer service 211 that has displayed the virtual printer addition screen (FIG. 7B) performs a printer search process. The printer search process is realized by performing a process as illustrated in later-described FIG. 11. For example, the virtual printer service 211 performs a device search by transmitting a search request by the Bonjour™ protocol to the network 100 using the function of the OS 210 and receiving a response to the search request from a device on the network 100.

Next, in S603, the virtual printer service 211 determines whether or not the printers searched in S602 include the target printer of the virtual printer service 211. Here, to determine whether or not the printer is the target printer, a list of target printers of the virtual printer service held inside the virtual printer service 211 is used. In a case where the printer searched in S602 is included in this list, the virtual printer service 211 determines that the searched printer is the target printer.

Table 1 exemplarily shows information of the list of the target printers for the virtual printer service.

TABLE 1

| | Printer Name |
|---|---|
| Target Printer for Virtual Printer Service | printer AY printer BZ printer CX |

In the list of the target printers, only the printers to which the virtual printer service 211 corresponds among the printers that do not correspond to the printing system allows the printing without using the printer driver (that is, not corresponding to a specific protocol) are listed. This list has been held inside the virtual printer service 211 before the virtual printer service 211 is installed.

In Table 1, "Printer Name" indicates the name of the printer concerned.

Besides, Table 2 exemplarily shows information of the list of the printers searched in S602.

TABLE 2

| | Printer Name | IP Address | Service Type |
|---|---|---|---|
| Searched Printer | printer AY | 1.1.1.3 | _printer._tcp |
| | printer BZ | 1.1.1.4 | _printer._tcp |

In Table 2, "Printer Name" indicates the name of the printer concerned. That is, "Printer Name" is the name of the printer previously held by the printer concerned, and corresponds to the printer name notified (responded) by the printer concerned according to the Bonjour™ protocol when searched in S602. Incidentally, the printer name is generally a name related to a printer model, and this printer name is used also in Table 1. Incidentally, the notification (response) according to the Bonjour™ protocol from the printer may include an identifier that can identify the printer model, such as a printer model name.

Besides, "IP Address" indicates the address of the printer concerned on a network.

Besides, "Service Type" indicates the service to which the printer concerned corresponds. For example, a device having a service type of "_printer._tcp" indicates that this device is the printer corresponding to a Line Printer Daemon (LPD) protocol.

Incidentally, in the list of Table 2, all the printers searched in S602 are listed.

The virtual printer service 211 determines whether or not the searched printer is the target printer of the virtual printer service by comparing the printers shown in Tables 1 and 2. In the example shown in Tables 1 and 2, it is determined that the printers AY and BZ are the target printers. In this determination, an example is shown in which a list (so-called whitelist) of the printers that do not correspond to a specific protocol and that the virtual printer service 211 corresponds to is used. That is, in a case where the searched printer is included in this list, the printer is determined to be the target printer. However, this determination may be performed using a list (so-called blacklist) of the printers that correspond to a specific protocol or printers to which the virtual printer service 211 does not correspond. In this situation, in a case where the searched printer is not included in this list, the printer is determined to be the target printer. That is, any configuration may be used as long as the virtual printer service 211 selects the printer for which the virtual printer is to be generated, on the basis of the information such as the list that can identify the printer that does not correspond to the specific protocol or the printer that the virtual printer service 211 corresponds to.

In S603, when the printers searched in S602 do not include any target printer of the virtual printer service (NO in S603), the virtual printer service 211 ends the process of this flowchart.

On the other hand, in S603, when the printers searched in S602 include the target printer of the virtual printer service (YES in S603), the virtual printer service 211 advances the process to S604.

In S604, the virtual printer service 211 displays the printer name of the printer determined to be the target printer in S603, in the area 1011 of the virtual printer addition screen (FIG. 7B). In the example described above, the printer names of the printer AY 103 and the printer BZ 104 connected to the network 100 are displayed in the area 1012 and the area 1013, respectively. That is, the virtual printer service 211 presents to the user the list of the printers selected based on the above list (e.g., the list as in Table 1) among the printers searched in S602.

Next, in S605, the virtual printer service 211 performs a selection process of selecting the printer to which the virtual printer is to be connected. The virtual printer service 211 detects that the user presses the add button 1016 with the operation input device 205 such as the mouse in a state that any printer is being selected in the area 1011 of FIG. 7B. Then, the virtual printer service 211 obtains the information of the printer name, the name 1014 and the location 1015 of the printer selected in the area 1011, from the virtual printer addition screen (FIG. 7B). In the example of FIG. 7B, "PRINTER AY" is obtained as the information of the printer name of the selected printer, "PRINTER A" as the information of the name, and "3RD FLOOR OF MAIN BUILDING" as the information of the location.

Next, in S606, the virtual printer service 211 performs a virtual printer generation process. In this process, the printer selected in S605 is associated as the connection destination, and the virtual printer is generated based on the name and location obtained in S605. Incidentally, the virtual printer created in this process has the information notified by the printer defined by the Bonjour™ protocol. This information includes, for example, the connection destination of the virtual printer, the name of the virtual printer, the function of the virtual printer, information of virtual printer flag ON indicating that the printer is the virtual printer, and the like. The connection destination of the virtual printer corresponds to, for example, the Internet Protocol (IP) address of the printer selected in S605. More specifically, the connection destination is the IP address (exemplified in Table 2) obtained at the time of the search in S603. Besides, the function of the virtual printer corresponds to, for example, a support PDL, a support function and the like. The function of the virtual printer differs for each printer selected in S605, and is held inside the virtual printer service 211 before the virtual printer service is installed.

Besides, in order to perform printing using the generated virtual printer, it is necessary to register the generated virtual printer as a service program in the OS 210. The virtual printer registered as the service program in the OS 210 may always operates during the execution of the OS 210, and responds to inquiries from other programs and information devices. A sequence of a device search process illustrated in later described FIG. 12 is an example thereof. Thus, from other programs and information devices, it looks as if the virtual printer exists as a real printer. For this reason, in S602 above, the virtual printer is searched in the same manner as the real printer. In the present embodiment, since the searched virtual printer is excluded from the target printers, a virtual printer having the searched virtual printer as the connection destination is not generated.

Hereinafter, a printer registration process of registering the virtual printer to the OS 210 will be described.

Figure 8:
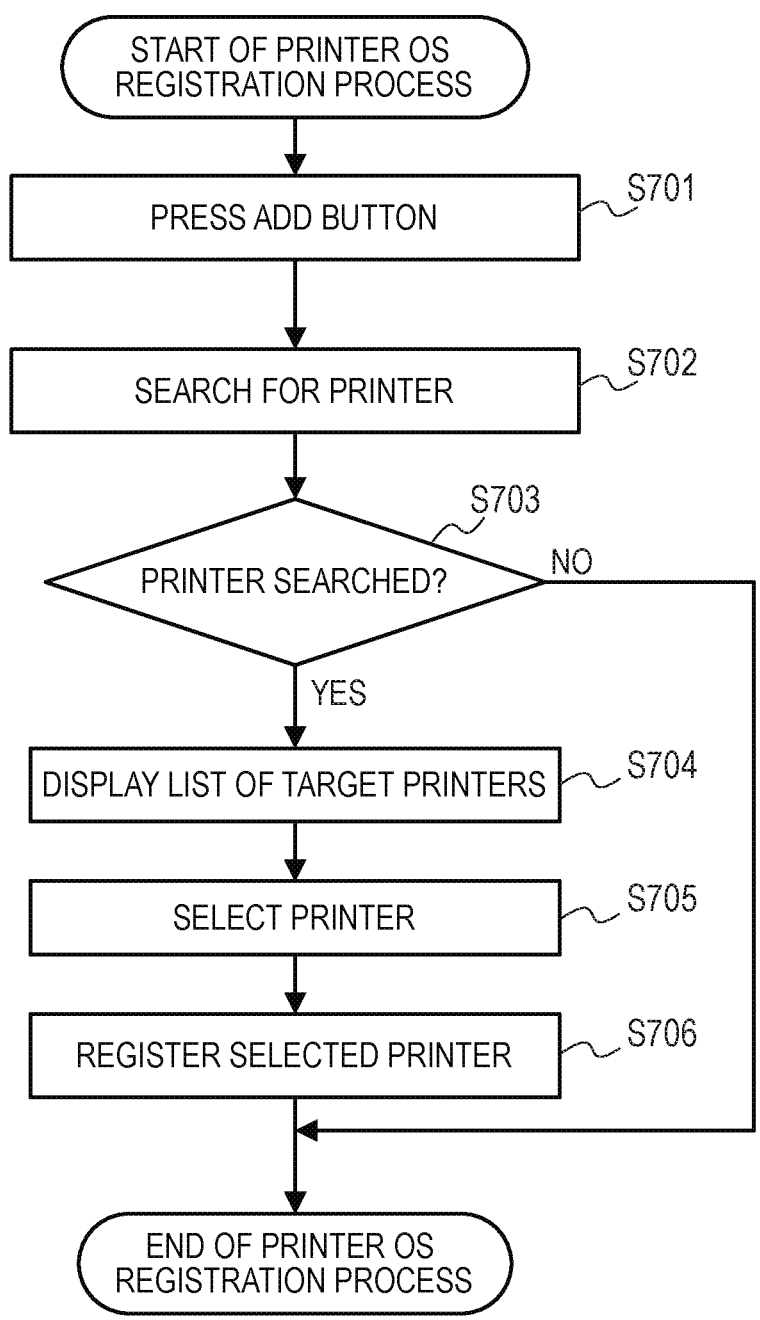
FIG. 8 is a flowchart for describing an example of a printer registration process in the OS.

FIG. 8 is a flowchart for describing an example of the printer registration process in the OS 210. The process of this flowchart is started when a main UI (FIG. 9A) for registering a printer as a printing destination in the OS 210 is displayed by a user operation.

In S701, the printing system 301 of the OS 210 detects that an add button is pressed by the user. Here, the add button is a "+" (plus) button 1104 in later-described FIG. 9A. Upon detecting that the "+" button 1104 is pressed, the printing system 301 of the OS 210 displays a printer registration screen illustrated in FIG. 9B, and advances the process to S702. Here, the UI for registering the printer as the printing destination in the OS 210 will be described with reference to FIGS. 9A and 9B.

Figure 9A:
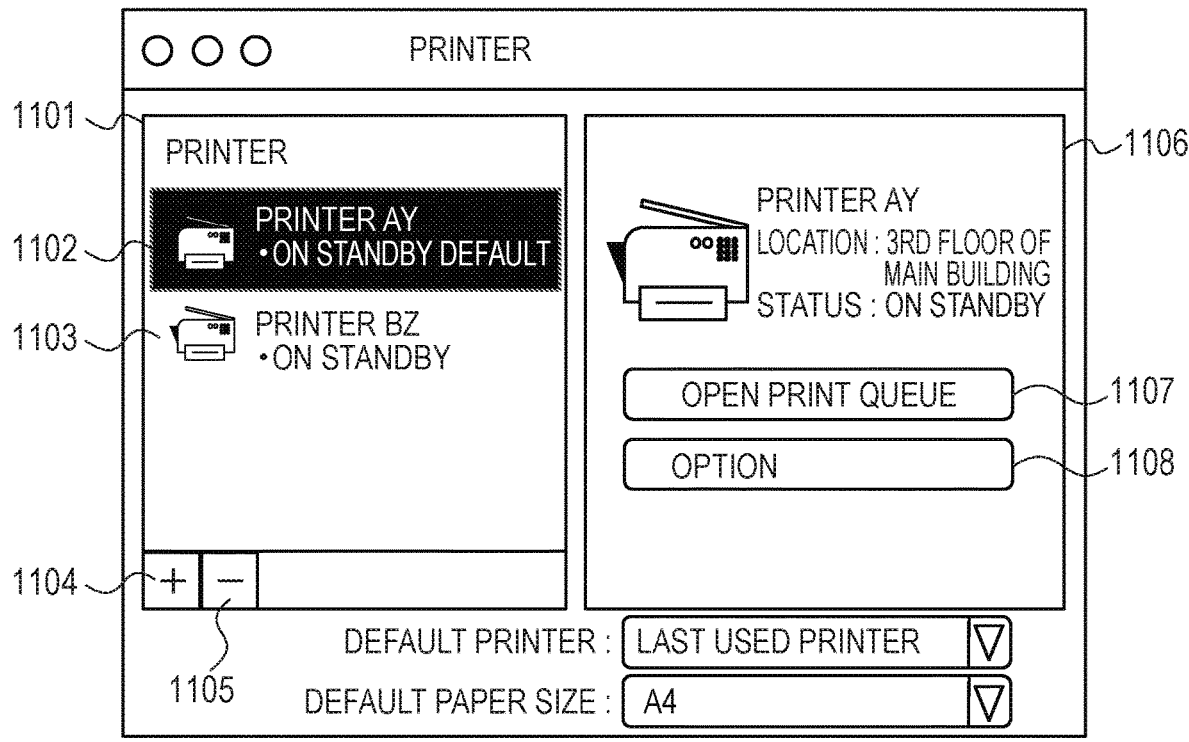
FIGS. 9A and 9B are views for describing examples of the UI for registering a printer as a printing destination in the OS.
Figure 9B:
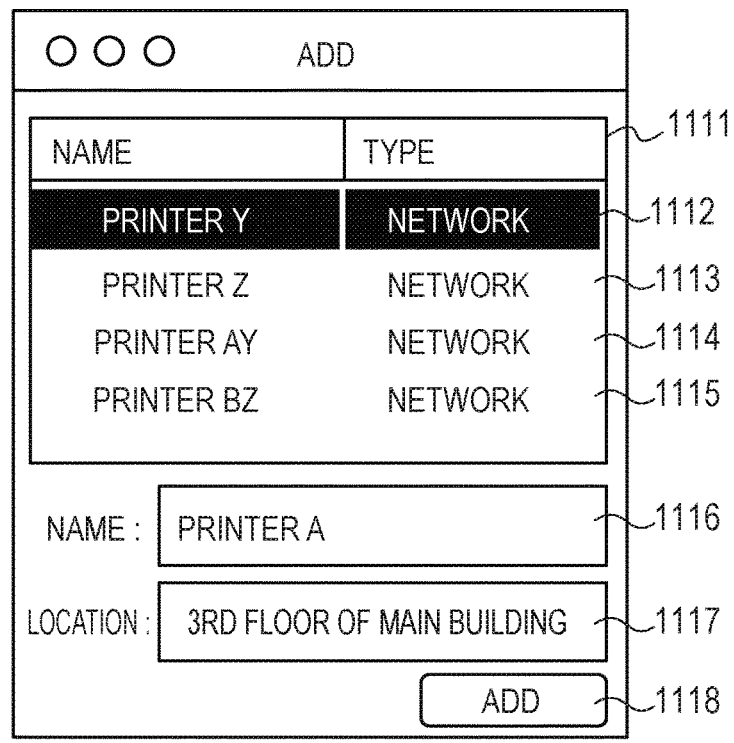

FIGS. 9A and 9B are the views for describing examples of the UI for registering the printer as the printing destination in the OS 210. The UI for registering the printer as the printing destination in the OS 210 is displayed on the display 207 of the host computer 101 on which the OS 210 has been activated.

FIG. 9A shows the main UI for registering the printer as the printing destination in the OS 210.

A list of printers already registered in the OS 210 as printing destinations is displayed in a printer list area 1101 of FIG. 9A. The example of FIG. 9A shows the UI in a state that the two printers (printer AY, printer BZ) have already been registered. Icon, name, and status of the printer AY are displayed in an area 1102. Similarly, icon, name, and status of the printer BZ are displayed in an area 1103.

By pressing the "+" (plus) button 1104, the user can additionally register a printer. The UI in a case where the "+" button 1104 is pressed will be described later with reference to FIG. 9B. Besides, by pressing a "−" (minus) button 1105, the user can delete the printer selected in the printer list area 1101.

Besides, in an area 1106, more detailed information of the printer selected in the printer list area 1101 is displayed. More specifically, an icon representing the printer, name, location and status of the printer, and the like are displayed. Further, by pressing an "OPEN PRINT QUEUE" button 1107, a state of the printer selected in the area 1101 can be displayed in more detail. Furthermore, by pressing an "OPTION" button 1108, it is possible to display a screen for changing a configuration of options (not illustrated) of the printer selected in the area 1101, and for displaying the remaining amount of a printing agent such as toner, ink, or the like.

FIG. 9B shows the example of the UI (printer addition screen) displayed when the "+" button 1104 of FIG. 9A is pressed. In an area 1111 of FIG. 9B, a list of real printers existing on the connected network, USB-connected real printers and virtual printers is displayed and presented to the user. The user can select a printer to be registered from the list of the area 1111 and input a name 1116 and a location 1117. Finally, by pressing an add button 1118, the UI returns to FIG. 9A, and the registered printer is added to the printer list area 1101 and displayed.

Here, the description returns to the flowchart of FIG. 8.

In S702, the printing system 301 of the OS 210 that has displayed the printer registration screen of FIG. 9B performs a printer search process. The search process is realized by performing the processes as illustrated in later-described FIGS. 11 and 12. For example, the printing system performs a device search by transmitting a search request by the Bonjour™ protocol from the OS 210 to the network 100 and receiving a response to the search request from a device on the network 100.

Next, in S703, the printing system of the OS determines whether or not the printer has been searched in S702.

Table 3 exemplarily shows information of the list of the printers searched in S703.

TABLE 3

|  | Printer Name | IP Address | Service Type |
|---|---|---|---|
| Searched Printer | printer Y | 1.1.1.30 | _ipp._tcp |
|  | printer Z | 1.1.1.40 | _ipp._tcp |
|  | printer AY | 1.1.1.3 | _printer._tcp |
|  | printer BZ | 1.1.1.4 | _printer._tcp |

In Table 3, "Printer Name" indicates the name of the printer concerned, and corresponds to the printer name notified (responded) from the printer concerned according to the Bonjour™ protocol.

Besides, "IP Address" indicates the address of the printer concerned on the network.

Besides, "Service Type" indicates the service to which the printer concerned corresponds. For example, a device having a service type of "_printer._tcp" indicates that this device is the printer corresponding to the LPD protocol. Besides, a device having a service type of "_ipp._tcp" indicates that this device is the printer corresponding to a protocol of (Internet Printing Protocol (IPP).

Here, it is assumed that the device having the service type of "_printer._tcp" or "_ipp._tcp" is determined to be the printer. Among the printers shown in Table 3, those that meet such conditions as above are "printer Y", "printer Z", "printer AY" and "printer BZ".

In S703, when no printer is searched in S702 (NO in S703), the printing system 301 of the OS 210 ends the process of this flowchart.

On the other hand, in S703, when the printer is searched in S702 (YES in S703), the printing system 301 of the OS 210 advances the process to S704.

In S704, the printing system 301 of the OS 210 displays a list of, as the printers, the devices determined to be the printers in S703 in the area 1111 of FIG. 9B. Therefore, in the area 1111, a list of real printers existing on the connected network, USB-connected real printers and virtual printers is displayed. The listed virtual printers include not only virtual printers created by the host computer 101 on which the OS 210 is running, but also virtual printers created by other host computers on the network to which the host computer 101 concerned is connected. In the example of FIG. 9B, the printer names of the real printers AY and BZ connected to the network are displayed respectively in areas 1114 and 1115. Also, the printer names of the virtual printers Y and Z created by another host computer (101b) on the network 100 are displayed respectively in areas 1112 and 1113. Incidentally, only those supported by the printing system of the OS 210 (corresponding to a specific protocol) may be displayed in the area 1111 of FIG. 9B.

Next, in S705, the printing system 301 of the OS 210 performs a selection process of selecting the printer to be registered in the OS 210. The printing system 301 of the OS 210 detects that the user presses the add button 1118 in a state that the printer is selected in the area 1111 of FIG. 9B. Then, the printing system 301 obtains the information of the printer name, the name 1116 and the location 1117 of the selected printer, from the printer registration screen (FIG. 9B). In the example of FIG. 9B, "PRINTER Y" is obtained as the information of the printer name of the selected printer, "PRINTER A" is obtained as the information of the name of the printer, and "3RD FLOOR OF MAIN BUILDING" is obtained as the information of the location.

Next, in S706, the printing system 301 of the OS 210 registers the printer in the OS 210. In this process, the printer selected in S705 is registered in the OS 210. The connection destination information is the IP address (exemplified in Table 3) obtained at the time of the search in S703, and the printer is registered in the OS 210 based on the information of the name and location of the printer similarly obtained in S705.

The connection-destination IP address, name, and location of the registered printer are stored in the external memory 209 of the host computer 101. Then, the UI returns to FIG. 9A, and the registered printer is added to the printer list area 1101 and displayed. After then, the registered printer can be selected as a transmission destination of a print job from a print setting screen (not illustrated) of the OS 210 opened from the application 212, and printing using a specific protocol becomes possible.

Hereinafter, a sequence of a device search process on the network will be described.

Figure 10:
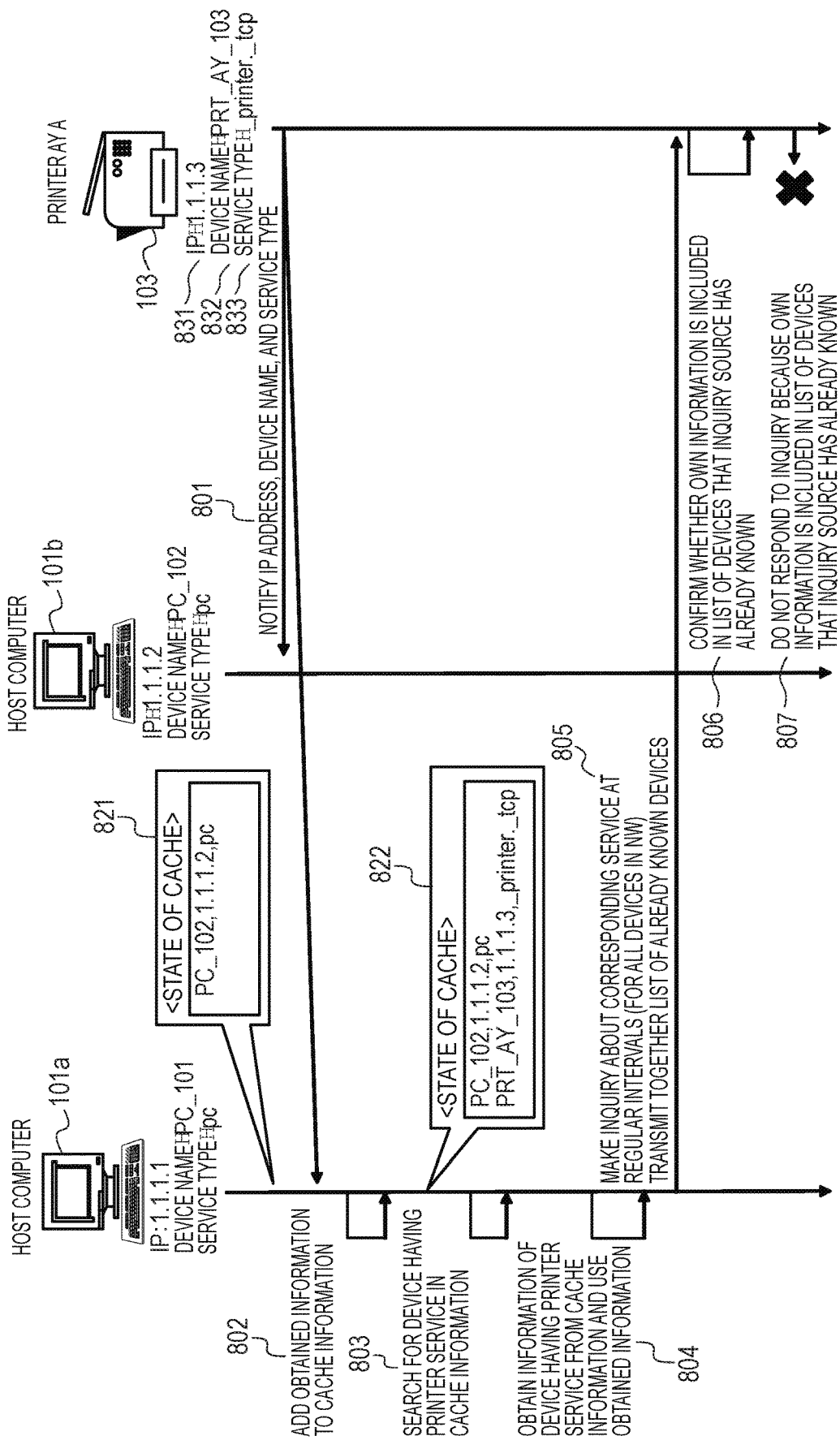
FIG. 10 is a sequence diagram of a device search process on a network.

FIG. 10 is a sequence diagram of a process to be performed when the printer AY 103 notifies existence of itself in the device search process on the network.

When the printer AY 103 joins the network, the printer AY 103 notifies an IP address 831, a device name 832, and a service type 833 of the printer AY 103 to devices existing on the same network by using the Multicast DNS technique (801). That is, the printer information is notified according to the Bonjour™ protocol. Here, the service type is a value indicating a service supported by the device in the Bonjour™ protocol. Table 4 exemplarily shows examples of the service types indicating printers.

TABLE 4

| Service Type |
|---|
| _printer._tcp |
| _pdl-datastream._tcp |
| _ipps._tcp |
| _ipp._tcp |

Upon receiving the notification from the printer AY 103, the host computer 101a adds the IP address 831, the device name 832 and the service type 833 of the printer AY 103 to cache information 821 (802). Here, the cache information is information to be used in a mechanism for reducing a load on the network in the Bonjour™ protocol. Table 5 exemplarily shows information included in the cache information.

TABLE 5

| | IP Address | Device Name | Service Type |
|---|---|---|---|
| Cache Information | 1.1.1.2 | PC_102 | pc |
| | 1.1.1.3 | PRT_AY | _printer._tcp |
| | . | . | . |
| | . | . | . |
| | . | . | . |

Then, when searching for a device on the network, the host computer 101a first searches, from cache information 822, for the device having the service type described in Table 4 as the service type (803). When the information of the printer AY 103 is included in the cache information, the information of the printer AY 103 included in the cache information is used for subsequent processes (804).

Further, the host computer 101a inquires the devices existing on the same network about corresponding services at regular intervals, by using the Multicast DNS technique (805). That is, a device search request based on the Bonjour™ protocol is transmitted. Incidentally, the host computer 101a, together with this inquiry, notifies a list of devices already known by the host computer 101a (i.e., a list based on the cache information 822) to the devices existing on the same network.

The printer AY 103 that has received the inquiry from the host computer 101a confirms whether or not the printer AY 103 is included in the list (cache information) 822 of the devices already known by the host computer 101a (806). In this example, the printer AY 103 determines that the printer AY 103 is included in the list 822 of the devices already known by the host computer 101a, and does not respond to the inquiry from the host computer 101a (807).

FIG. 11 is a sequence diagram of a process to be performed when the printer AY 103 notifies the IP address 831, the device name 832, and the service type 833 in response to a search from the host computer 101a in the device search process on the network.

The host computer 101a searches for, from cache information 971, a device having the service type described in Table 4 (951). When the device corresponding to the cache information 971 does not exist, the host computer 101a inquires a device existing on the same network about a corresponding service by using the Multicast DNS technique (952). That is, a device search request based on the Bonjour™ protocol is transmitted. Incidentally, even when the corresponding device exists, as well as 805 of FIG. 10, the host computer 101a inquires the devices existing on the same network about the corresponding service at regular intervals. Besides, the host computer 101a, together with this inquiry, notifies a list of devices (a list based on the cache information 971) already known by the host computer 101a to the devices existing on the same network.

The printer AY 103 confirms whether or not the printer AY 103 is included in the list of the devices already known to the host computer 101a (the list based on the cache information 971) (953). In this example, the printer AY 103 determines that the printer AY 103 is not included in the list 971 of the devices already known by the host computer 101a. Then, the printer AY 103 notifies the IP address 831, the device name 832 and the service type 833 of the printer AY 103 to the devices existing on the same network by using the Multicast DNS technique (954). That is, the printer information is responded according to the Bonjour™ protocol.

Then, the host computer 101a adds the IP address 831, the device name 832 and the service type 833 of the printer AY 103 to the cache information 971 (956).

The host computer 101a uses cache information 972 received from the printer AY 103 for subsequent processes (957).

FIG. 12 is a sequence diagram of a search process for the virtual printer created inside the host computer.

The virtual printer A 311 and the virtual printer B 312 are created inside the host computer 101a. Here, there will be described an example that the virtual printer A 311 notifies the existence of itself from the virtual printer A 311, and an example that the virtual printer B 312 notifies the existence of itself in response to a search from the host computer 101a.

The virtual printer A 311 notifies an IP address 2031, a device name 2032, and a service type 2033 of the virtual printer A 311 to the host computer 101a by using the Multicast DNS technique (2001). That is, the printer information is notified according to the Bonjour™ protocol.

The host computer 101a that has received the notification from the virtual printer A 311 adds the IP address 2031, the device name 2032 and the service type 2033 of the virtual printer A 311 to cache information 2021 (2002).

Then, when searching for a virtual printer in the host computer 101a, the host computer 101a first searches, from cache information 2022, for the device having the service type described in Table 4 as the service type (2003). When the information of the virtual printer A 311 is included in the cache information, the information of the virtual printer A 311 included in the cache information is used for subsequent processes (2004).

Further, the host computer 101a inquires the virtual printer in the host computer 101a about corresponding services at regular intervals, by using the Multicast DNS technique (2005). That is, a device search request based on the Bonjour™ protocol is transmitted. The host computer 101a, together with the inquiry, notifies a list of devices already known by the host computer 101a (a list based on the cache information 2022; the list 2022) to the virtual printer in the host computer 101a.

The virtual printer A 311 that has received the inquiry from the host computer 101a confirms whether or not the virtual printer A 311 is included in the list 2022 of the devices already known by the host computer 101a (2006).

The virtual printer A 311 determines that the virtual printer A 311 is included in the list 2022 of the devices already known by the host computer 101*a*, and does not respond to the inquiry from the host computer 101*a* (2007).

The virtual printer B 312 that has received the inquiry from the host computer 101*a* confirms whether or not the virtual printer B 312 is included in the list 2022 of the devices already known by the host computer 101*a* (2008). The virtual printer B 312 determines that the virtual printer B 312 is not included in the list 2022 of the devices already known by the host computer 101*a*. Then, the virtual printer B 312 notifies an IP address 2041, a device name 2042 and a service type 2043 of the virtual printer B 312 to the host computer 101*a* by using the Multicast DNS technique (2009). That is, the printer information is responded according to the Bonjour™ protocol.

The host computer 101*a* adds the IP address 2041, the device name 2042 and the service type 2043 of the virtual printer B 312 to the cache information 2022, and obtains cache information 2023 (2010).

Figure 13A:
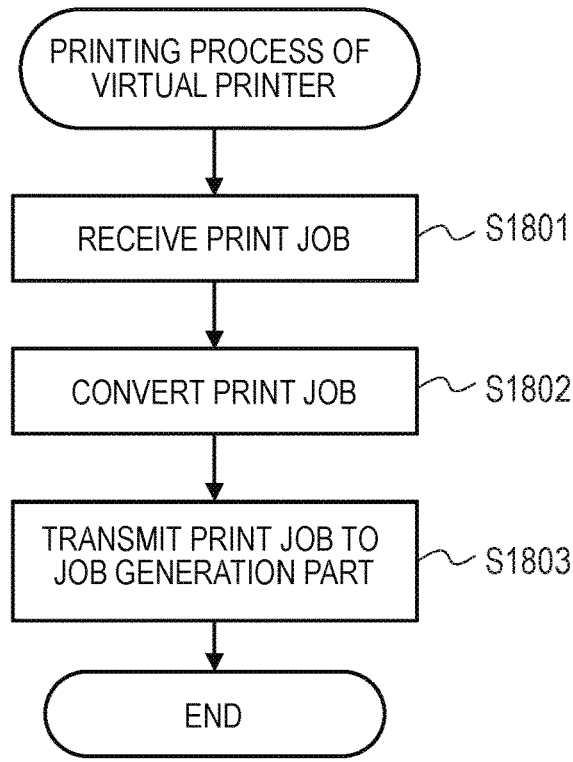
FIGS. 13A and 13B are flowcharts for respectively describing an example of a process to be performed by the virtual printer when printing is performed, and an example of a process to be performed by a job generation part when printing is performed.

FIG. 13A is a flowchart for describing an example of a process to be performed by the virtual printer when printing is performed.

In S1801, upon receiving a print job from the printing system 301 in the OS 210, the virtual printer (e.g., the virtual printer A 311) advances the process to S1802.

In S1802, the virtual printer converts the print job received in S1801 into a format that the job generation part 303 can recognize. Incidentally, the format capable of being recognized by the job generation part 303 is, for example, the PDF.

Next, in S1803, the virtual printer transmits the print job converted in S1802 to the job generation part 303, and ends the process of this flowchart.

Figure 13B:
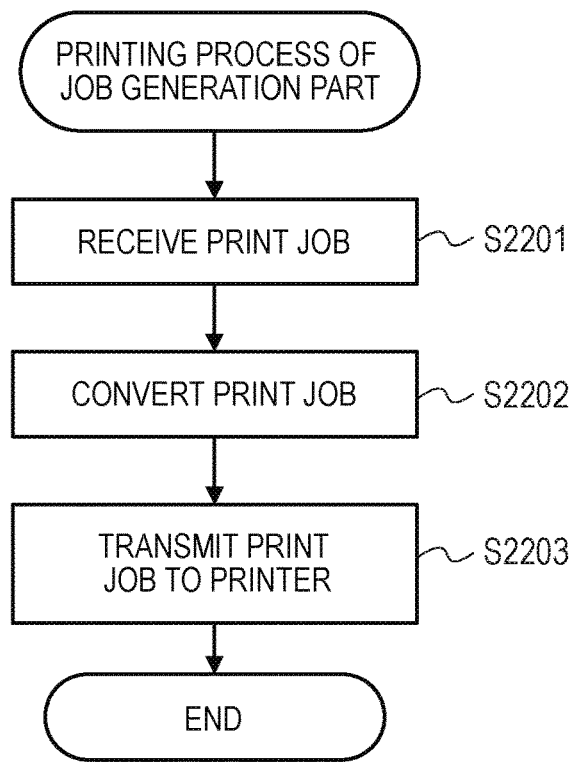

FIG. 13B is a flowchart for describing an example of a process to be performed by the job generation part 303 when printing is performed.

In S2201, the job generation part 303 of the virtual printer service 211 receives a print job from the virtual printer (e.g., the virtual printer A 311), and advances the process to S2202.

In S2202, the job generation part 303 converts the print job received in S2201 into a format that can be recognized (interpreted) by a real printer (e.g., the printer AY 103) with which the virtual printer that is the source of the print job is associated. Here, the format that can be recognized by the real printer is, for example, the raster format.

Next, in S2203, the job generation part 303 transmits the print job converted in S2202 to the real printer associated with the virtual printer that is the transmission source of the print job, and ends the process of this flowchart.

FIG. 14 is a diagram for describing an example of a file configuration of the virtual printer service 211. When the virtual printer service 211 is installed in the host computer 101, files related to the virtual printer service 211 are stored in the external memory 209 of the host computer 101 in a configuration as illustrated in FIG. 14.

All the files related to the virtual printer service 211 are stored in a "Contents" folder 1202 of a "VirtualPrinterService.app" folder 1201. Immediately below, there are an "Application" folder 1203 that is a storage location of execution modules and a "Resources" folder 1210 that is a storage location of resources.

In the "Application" folder 1203, there is a "Virtual Printer Service" folder 1204 in which the main program of the virtual printer service 211 is stored. The process of the virtual printer service 211 is realized by loading a program under the "Virtual Print Service" folder 1204 into the RAM 202 and executing the loaded program with the CPU 201.

Further, there is a "Driver" folder 1205 in the "Application" folder 1203.

Under the "Driver" folder 1205, there is a "Utilities" folder 1206 in which various utility applications (hereinafter, "utilities") are stored. In the present embodiment, "PrinterUtility.app" 1207, "StatusMonitor.app" 1208 and "AutoShutdownTool.app" 1209 are stored as the utilities in the "Utilities" folder 1206. These utilities are application programs that provide additional functions to the printer, and are similar to those used in a printing system using a printer driver.

For example, the "PrinterUtility.app" (printer utility) 1207 is the utility mainly for an office printer (a real printer being provided with a UI panel), and has a printer information display function and a remote UI display function.

The "StatusMonitor.app" (status monitor) 1208 is the utility mainly for a model having no UI panel in a real printer, and has a function of displaying a state when paper or toner runs out and a function of displaying information of a print job currently being output.

The "AutoShutdownTool.app" (auto-shutdown tool) 1209 is the utility for automatically shutting down a real printer.

Besides, there are a "Driver" folder 1211 and a "PPDs" folder 1213 under the "Resources" folder 1210. In the "Driver" folder 1211, there is an "Icons" folder 1212 that stores a file whose appearance is iconified for each model.

Besides, in the "PPDs" folder 1213, text files called PPD files each describing model-dependent information for each model are stored for the numbers of corresponding models (1214 to 1216). In the example of FIG. 14, the PPD file that describes the model-dependent information for the printer AY 103 is a "PrinterAY.ppd" file 1214. Besides, the PPD file that describes the model-dependent information for the printer BZ 104 is a "PrinterBZ.ppd" file 1215. Besides, the PPD file that describes the model-dependent information for the printer CX is a "PrinterCX.ppd" file 1216. The PPD file is also used as a configuration file of the printer driver, and can be created by diverting a configuration file for the printer driver.

In the configuration file of the virtual printer service 211, there are the two "Driver" folders (1205, 1211). Actually, the virtual printer service 211 is the application that is not directly related to the printer driver, but development cost can be reduced by diverting the file used in the printer driver as much as possible. While the printer driver exists for each model, the virtual printer service 211 corresponds to a plurality of models. For this reason, the virtual printer service 211 holds all icons, PPD files, and utilities for the plurality of models in the configuration file.

Incidentally, the contents of the folders and files shown in FIG. 14 are only for describing the present disclosure, and there are actually many other configuration files of the virtual printer service 211. In the present embodiment, explanation of other configuration files will be omitted.

Figure 15A:
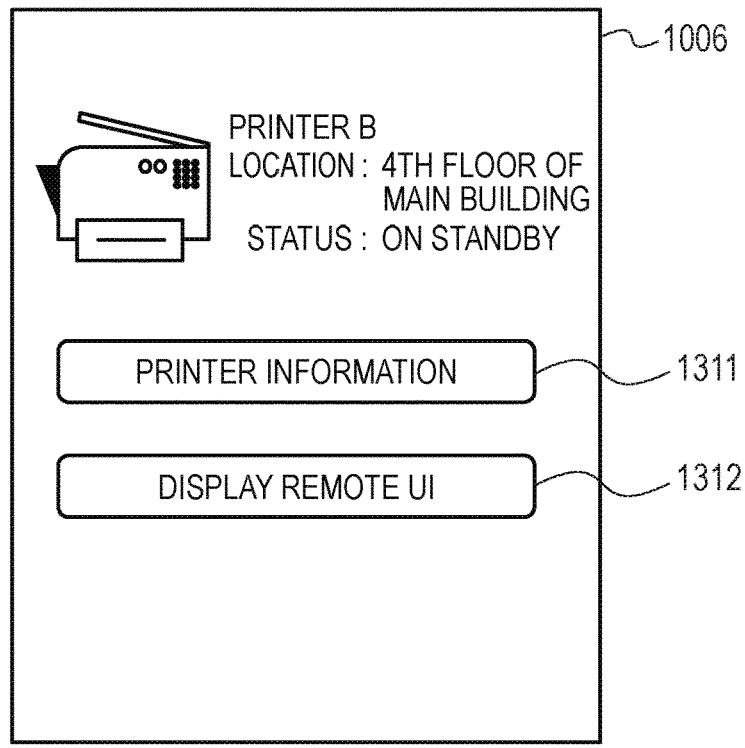
FIGS. 15A and 15B are views for respectively describing an example of a virtual printer service UI and a status monitor UI according to the first embodiment.

FIG. 15A is a view for describing an example of the UI of the virtual printer service 211 according to the first embodiment.

In FIG. 7A described above, the area 1006 at the time when the virtual printer of "PRINTER A" is selected by the user has been described. As illustrated in FIG. 7A, when "PRINTER A" is selected, the "ACTIVATE STATUS MONITOR" button 1007 is displayed in the area 1006. On the other hand, the area 1006 of FIG. 15A shows the UI displayed in the area on the right when a virtual printer "PRINTER B" is selected.

As for the printer B, a "PRINTER INFORMATION" button 1311 and a "DISPLAY REMOTE UI" button 1312 are displayed. The "PRINTER INFORMATION" button 1311, the "DISPLAY REMOTE UI" button 1312, and the "ACTIVATE STATUS MONITOR" button 1007 of FIG. 7A correspond to the respective user interfaces for activating the different utilities. Here, it is assumed that the connection destination of "PRINTER A" is the printer AY 103 and the connection destination of "PRINTER B" is the printer BZ 104. Since the printer AY 103 and the printer BZ 104 have different models, different utilities are required. Therefore, also as for the UI for each of the virtual printers "PRINTER A" and "PRINTER B", the activation button of the utility corresponding to each model is displayed. Incidentally, a process of switching and displaying the activation button of a different utility according to the model of the real printer to which the virtual printer is connected will be described later with reference to FIG. 16.

Figure 15B:
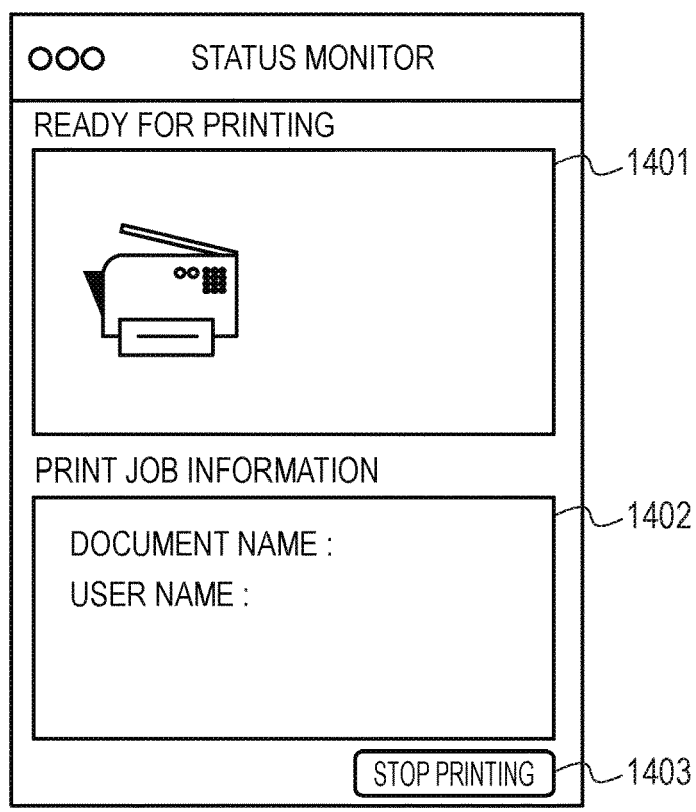

FIG. 15B is a view for describing an example of a status monitor UI displayed when the user presses the "ACTIVATE STATUS MONITOR" button 1007 illustrated in FIG. 7A. As described above, the status monitor is a utility mainly for a model having no UI panel in a real printer.

In an area 1401, for example, a state display such as when paper or toner runs out is performed. In an area 1402, the document name and the user name of the information of the print job currently being output is displayed.

The user can also stop the print job being printed by pressing a "STOP PRINTING" button 1403. Such operations as above are the same as utilities that operate in cooperation with an existing printer driver.

Next, a process in which the virtual printer service 211 switches activation button display of utility applications (hereinafter, "utilities") on the UI for each virtual printer will be described.

Figure 16:
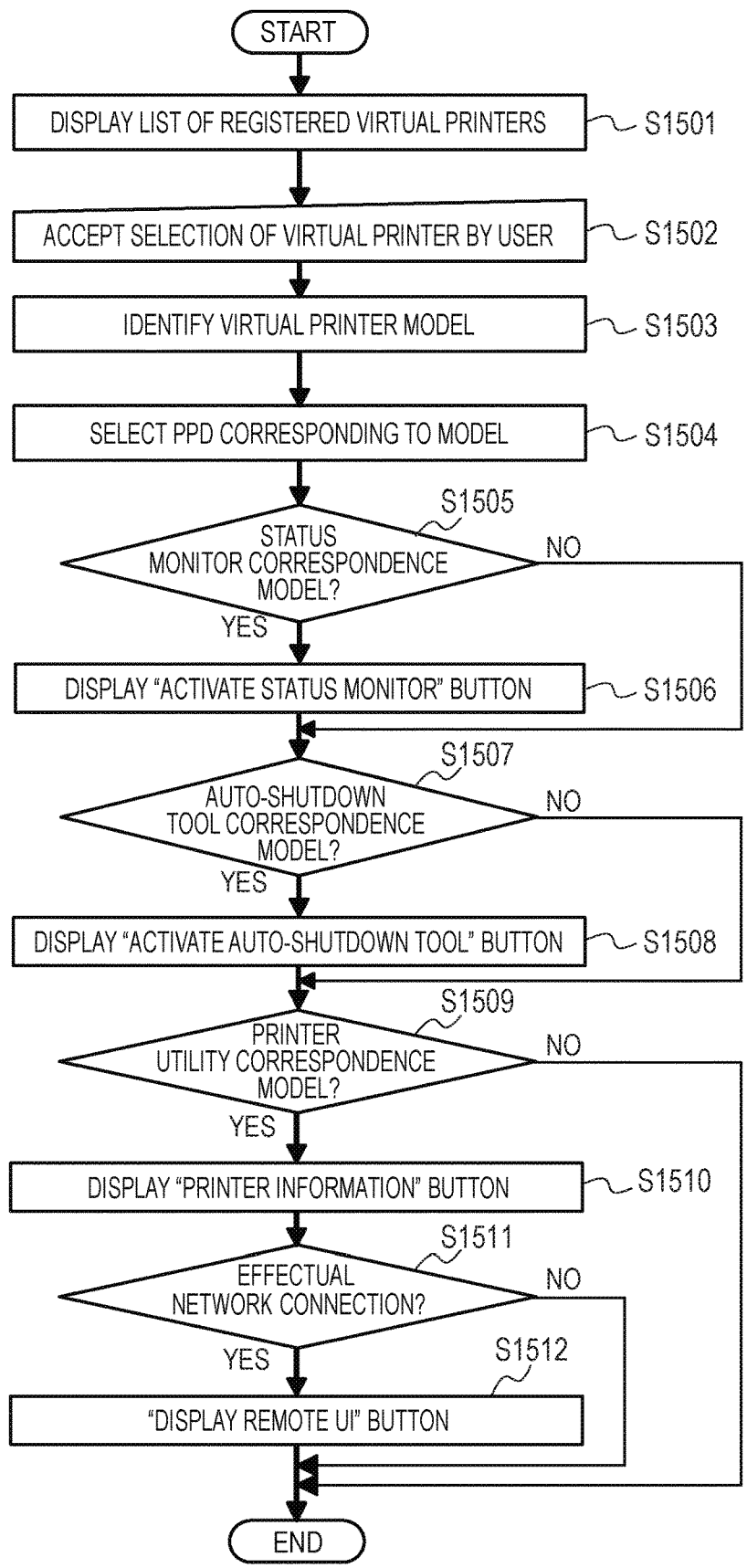
FIG. 16 is a flowchart for describing an example of a process of switching display of a utility activation button on the UI for each virtual printer.

FIG. 16 is the flowchart for describing an example of a process in which the virtual printer service 211 switches utility activation button display on the UI for each virtual printer. The process of this flowchart is realized by loading a main body program of the virtual printer service 211 into the RAM 202 and executing the loaded program with the CPU 201.

When the main UI of the virtual printer service (FIG. 7A) is opened, the virtual printer service 211 advances the process to S1501. Incidentally, the main UI of the virtual printer service is opened when the virtual printer service 211 is activated or in response to a user operation.

In S1501, the virtual printer service 211 displays a list of currently registered virtual printers (managed by the virtual printer service 211) on the main UI of the virtual printer service.

Next, in S1502, the virtual printer service 211 accepts a selection of a virtual printer by the user. Incidentally, immediately after the activation, the first virtual printer in the virtual printer list may be automatically selected in advance.

Next, in S1503, the virtual printer service 211 identifies the model of the virtual printer selected in S1502 (i.e., the model of the real printer to which the virtual printer is connected). In a method of specifying the model, it is possible to identify the model by storing an identifier such as a model name of a USB- or network-connected real printer at the time of adding (generating) the virtual printer illustrated in FIGS. 7A, 7B and 8, and then using the stored identifier.

Next, in S1504, the virtual printer service 211 selects the PPD file corresponding to the model specified in S1503. As illustrated in FIG. 14, since the PPD file exists for each model in the configuration file of the virtual printer service 211, the PPD of the corresponding model is selected from the PPD files, and the selected PPD file is read.

Next, in S1505, the virtual printer service 211 determines from the description of the PPD file selected in S1504 whether or not the real printer to which the virtual printer selected in S1503 is connected is a status monitor correspondence model. Incidentally, the contents of the PPD file will be described later with reference to FIGS. 17A and 17B.

When the real printer is the status monitor correspondence model (YES in S1505), the virtual printer service 211 advances the process to S1506.

In S1506, the virtual printer service 211 displays the "ACTIVATE STATUS MONITOR" button in the area 1006 of the main UI, and advances the process to S1507.

On the other hand, when the real printer is not the status monitor correspondence model (NO in S1505), the virtual printer service 211 advances the process to S1507 without displaying the "ACTIVATE STATUS MONITOR" button.

In S1507, the virtual printer service 211 determines from the description of the PPD file selected in S1504 whether or not the real printer to which the virtual printer selected in S1503 is connected is an auto-shutdown tool correspondence model.

When the real printer is the auto-shutdown tool correspondence model (YES in S1507), the virtual printer service 211 advances the process to S1508.

In S1508, the virtual printer service 211 displays an "ACTIVATE AUTO-SHUTDOWN TOOL" button in the area 1006 of the main UI, and advances the process to S1509. On the other hand, when the real printer is not the auto-shutdown tool correspondence model (NO in S1507), the virtual printer service 211 advances the process to S1509 without displaying the "ACTIVATE AUTO-SHUTDOWN TOOL" button.

Next, in S1509, the virtual printer service 211 determines from the description of the PPD file selected in S1504 whether or not the real printer to which the virtual printer selected in S1503 is connected is a printer utility correspondence model.

When the real printer is not the printer utility correspondence model (NO in S1509), the virtual printer service 211 ends the process of this flowchart as it is.

On the other hand, when the real printer is the printer utility correspondence model (YES in S1509), the virtual printer service 211 advances the process to S1510.

In S1510, the virtual printer service 211 displays the "PRINTER INFORMATION" button in the area 1006 of the main UI.

Further, in S1511, the virtual printer service 211 determines whether or not a connection form with the real printer to which the virtual printer selected in S1503 is connected is a network connection capable of displaying a remote UI.

When the connection form with the real printer is the network connection capable of displaying the remote UI (YES in S1511), the virtual printer service 211 advances the process to S1512.

In S1512, the virtual printer service 211 displays the "DISPLAY REMOTE UI" button in the area 1006 of the main UI, and ends the process of this flowchart.

On the other hand, when the connection form with the real printer is not the network connection capable of displaying the remote UI (NO in S1511), the virtual printer service 211 ends the process of this flowchart without displaying the "DISPLAY REMOTE UI" button.

The printer utility has the two functions of displaying the printer information and displaying the remote UI. Therefore, when the model is the printer utility correspondence model, the processes in S1510 to S1512 are performed. Besides, an optimal button arrangement and process flow can be taken by functions of a target utility.

The virtual printer service 211 generates and manages virtual printers corresponding to a plurality of printer models. Even with the virtual printer service 211 like this, by referring to the PPD file corresponding to the model of the real printer to which the virtual printer is connected, it is possible to display a utility activation button appropriate for each virtual printer on the UI.

Next, the contents of the PPD file will be described with reference to FIGS. 17A and 17B.

Figure 17A:
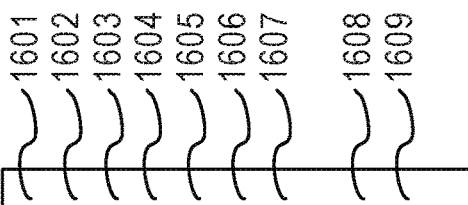
FIGS. 17A and 17B are diagrams for describing examples of a PPD file according to the first embodiment.

FIG. 17A is the diagram for describing an example of the PPD file of the printer AY 103.

Figure 17B:
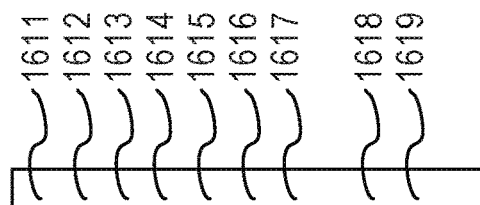

FIG. 17B is the diagram for describing an example of the PPD file of the printer BZ 104.

In FIG. 17A, "FormatVersion" 1601 indicates a version of the format of the PPD file.

"FileVersion" 1602 indicates a version of this PPD file.

"LanguageVersion" 1603 indicates a language used in this PPD file.

"LanguageEncoding" 1604 indicates encoding used in this PPD file.

"PCFileName" 1605 indicates a file name of this PPD file.

"Manufacture" 1606 indicates a developer of this PPD file.

"Product" 1607 indicates a product name of the printer.

"APPrinterUtilityPath" 1608 indicates a path to a utility application corresponding to a model supported by this PPD file. The path to the utility application is the path to the application described with reference to FIG. 14. In the example of FIG. 17A, since the printer AY 103 is the model corresponding to the status monitor, the path for "StatusMonitor.app" is described in "APPrinterUtilityPath" 1608. In S1505 of FIG. 16 described above, "APPrinterUtilityPath" 1608 is confirmed when determining whether or not the virtual printer service 211 is the status monitor correspondence model.

"APPrinterIconPath" 1609 is a path to an icon file for making it easy to identify the printer AY 103. The icon designated here is displayed, for example, as 1008 in the area 1006 of FIG. 7A.

Since the PPD file of the printer BZ 104 (1611, 1612, 1613, 1614, 1615, 1616, 1617, and 1619) in FIG. 17B is the same as that in FIG. 17A, explanation thereof will be omitted.

Incidentally, "APPrinterUtilityPath" 1618 illustrated in FIG. 17B is different from "APPrinterUtilityPath" 1608 illustrated in FIG. 17A, and describes a path of the printer utility corresponding to the printer BZ 104. This indicates that the printer BZ 104 is not the status monitor correspondence model but is the printer utility correspondence model.

Based on the PPD file like this, the virtual printer service 211 displays, on the UI, the activation button of, among the plurality of utilities, the utility corresponding to the model of the image forming apparatus to which the virtual printer selected in the virtual printer list is connected.

Next, a process to be performed by the virtual printer service 211 when the utility display button (e.g., 1007, 1311, 1312, or the like) illustrated in FIG. 7A or FIG. 15A is pressed will be described.

Figure 18:
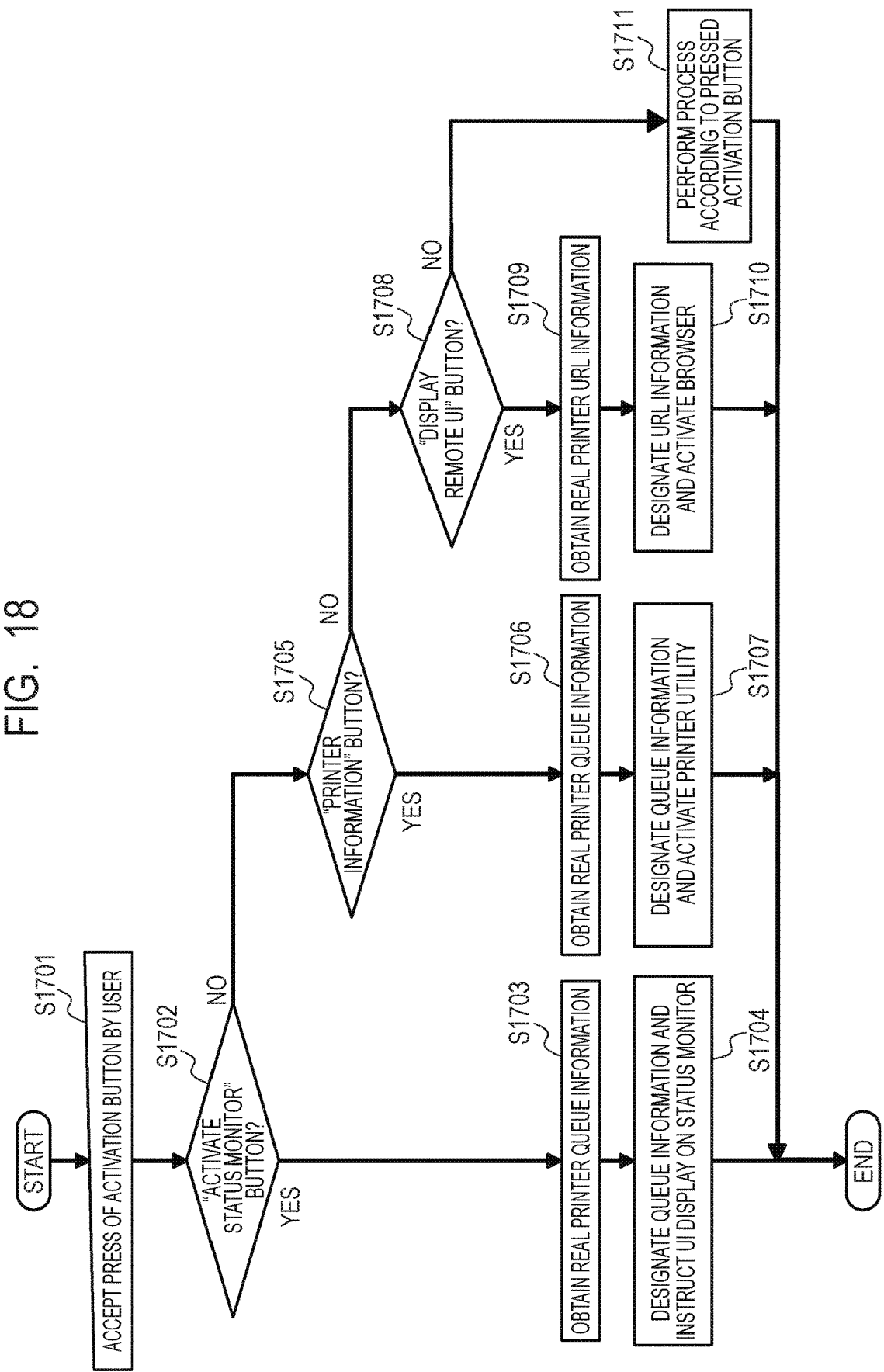
FIG. 18 is a flowchart for describing an example of a process of the virtual printer service to be performed when a utility activation button of a main UI of the virtual printer service is pressed.

FIG. 18 is a flowchart for describing an example of a process of the virtual printer service 211 to be performed when the utility activation button of the main UI of the virtual printer service is pressed. The process of this flowchart is realized by loading the main body program of the virtual printer service 211 into the RAM 202 and executing the loaded program with the CPU 201.

First, in S1701, the virtual printer service 211 accepts a press of the activation button (e.g., 1007, 1311, 1312, or the like) displayed in the area 1006 of the main UI, and advances the process to S1702.

In S1702, the virtual printer service 211 confirms whether or not the activation button pressed in S1701 is the "ACTIVATE STATUS MONITOR" button. When the pressed activation button is the "ACTIVATE STATUS MONITOR" button (YES in S1702), the virtual printer service 211 advances the process to S1703.

In S1703, the virtual printer service 211 obtains queue information of the real printer to which the virtual printer selected in the printer list area 1001 of the main UI is connected. Incidentally, the queue information indicates a name of a queue and, for example, an IP address of the printer when the real printer is network-connected.

Next, in S1704, the virtual printer service 211 designates the queue information obtained in S1703 and instructs the status monitor to perform UI display. In a case where the status monitor has already been activated, the status monitor UI-displays a screen displaying the state of the actual device based on the queue information given at this timing. On the other hand, in a case where the status monitor is not activated yet, the status monitor is activated. The activated status monitor UI-displays the screen displaying the state of the actual device based on the designated queue information.

When the activation button pressed in S1701 is not the "ACTIVATE STATUS MONITOR" button in S1702 (NO in S1702), the virtual printer service 211 advances the process to S1705.

In S1705, the virtual printer service 211 confirms whether or not the activation button pressed in S1701 is the "PRINTER INFORMATION" button. Then, when the activation button is the "PRINTER INFORMATION" button (YES in S1705), the virtual printer service 211 advances the process to S1706.

In S1706, the virtual printer service 211 obtains the queue information of the real printer to which the virtual printer selected in the printer list area 1001 of the main UI is connected.

Next, in S1707, the virtual printer service 211 activates the printer utility (PrinterUtillity.app) by designating the queue information obtained in S1706. The activated printer utility UI-displays the printer information of the real printer based on the designated queue information.

In S1705, when the activation button pressed in S1701 is not the "PRINTER INFORMATION" button (NO in S1705), the virtual printer service 211 advances the process to S1708.

In S1708, the virtual printer service 211 confirms whether or not the activation button pressed in S1701 is the "DISPLAY REMOTE UI" button. When the activation button is the "DISPLAY REMOTE UI" button (YES in S1708), the virtual printer service 211 advances the process to S1709.

In S1709, the virtual printer service 211 obtains URL information of the real printer to which the virtual printer selected in the printer list area 1001 of the main UI is connected.

Next, in S1710, the virtual printer service 211 activates a Web browser by designating the URL information obtained in S1709. The activated Web browser accesses a server function of the real printer based on the designated URL information, so that a remote UI is displayed on the Web browser.

In S1708, when the activation button pressed in S1701 is not the "DISPLAY REMOTE UI" button (NO in S1708), the virtual printer service 211 performs a process corresponding to the activation button pressed in S1701 (S1711). For example, in the case where the activation button pressed in S1701 is the "ACTIVATE AUTO-SHUTDOWN TOOL" button, the virtual printer service 211 obtains the IP address of the real printer to which the virtual printer selected in the printer list area 1001 of the main UI is connected. Further, the virtual printer service 211 activates the auto-shutdown tool (AutoShutdownTool.app) by designating the IP address.

As just described, the virtual printer service 211 can UI-display the button of the utility different depending on the model of the real printer to which the virtual printer is connected. Besides, when the button of the utility is pressed, an appropriate function can be provided to the user while activating the utility corresponding to the pressed button and/or giving the instruction for the UI display.

As described above, it is possible to switch and display the activation buttons of the different utilities depending on the model of the real printer to which the selected virtual printer is connected. Thus, even in the printing system that does not use the printer driver, it is possible to provide to the user the different utility for each model of image forming apparatus to which the virtual printer is connected.

Second Embodiment

In the first embodiment, the example in which one utility is associated with one virtual printer has been described. In the second embodiment, an example in which a plurality of utilities are associated with one virtual printer will be described.

Figure 19:
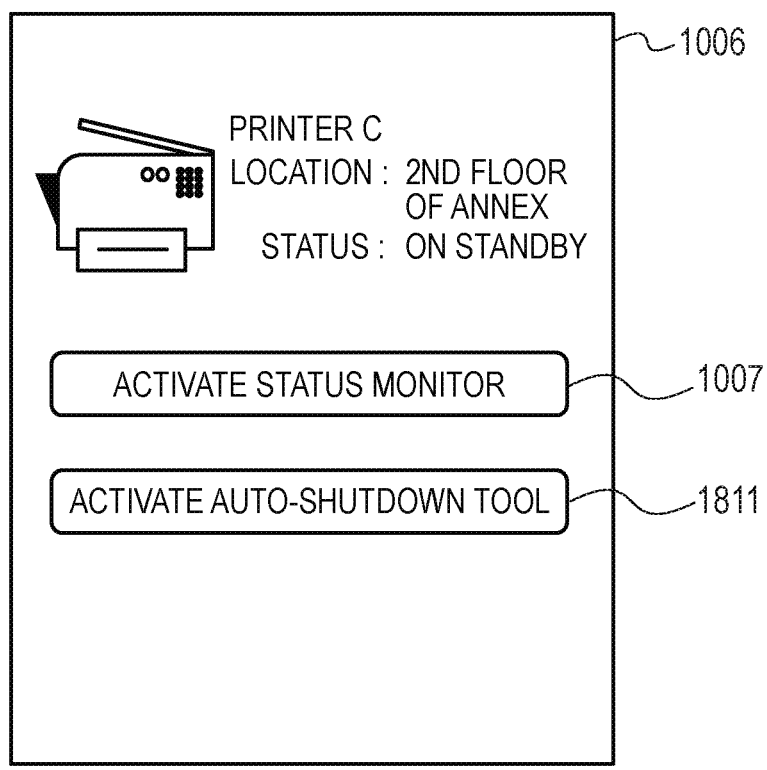
FIG. 19 is a view for describing an example of a virtual printer service UI according to a second embodiment.

FIG. 19 is a view for describing an example of the UI of the virtual printer service 211 according to the second embodiment.

In the first embodiment, the area 1006 in the case where the virtual printer of "PRINTER A" is selected by the user has been described with reference to FIG. 7A. Besides, the area 1006 in the case where the virtual printer of "PRINTER B" is selected by the user has been described with reference to FIG. 15A. In the second embodiment, FIG. 19 shows an example of the UI that is displayed in the area 1006 in a case where a virtual printer of "PRINTER C" is selected. Incidentally, since the procedure for creating the virtual printer of "PRINTER C" for the real Printer CX is the same as that described in the first embodiment, explanation thereof will be omitted here.

As illustrated in FIG. 19, in the area 1006, two buttons, i.e., the "ACTIVATE STATUS MONITOR" button 1007 and an "ACTIVATE AUTO-SHUTDOWN TOOL" button 1811 are displayed. These buttons are the activation buttons for different utility applications.

In this example, it is assumed that two utility applications ("StatusMonitor.app" and "AutoShutdownTool.app") are described in the PPD file corresponding to the model of the real printer CX. In this case, the virtual printer service 211 displays the two utility application activation buttons ("ACTIVATE STATUS MONITOR" button 1007, "ACTIVATE AUTO-SHUTDOWN TOOL" button 1811) as illustrated in FIG. 19 by the process described with reference to FIG. 16.

Figure 20:
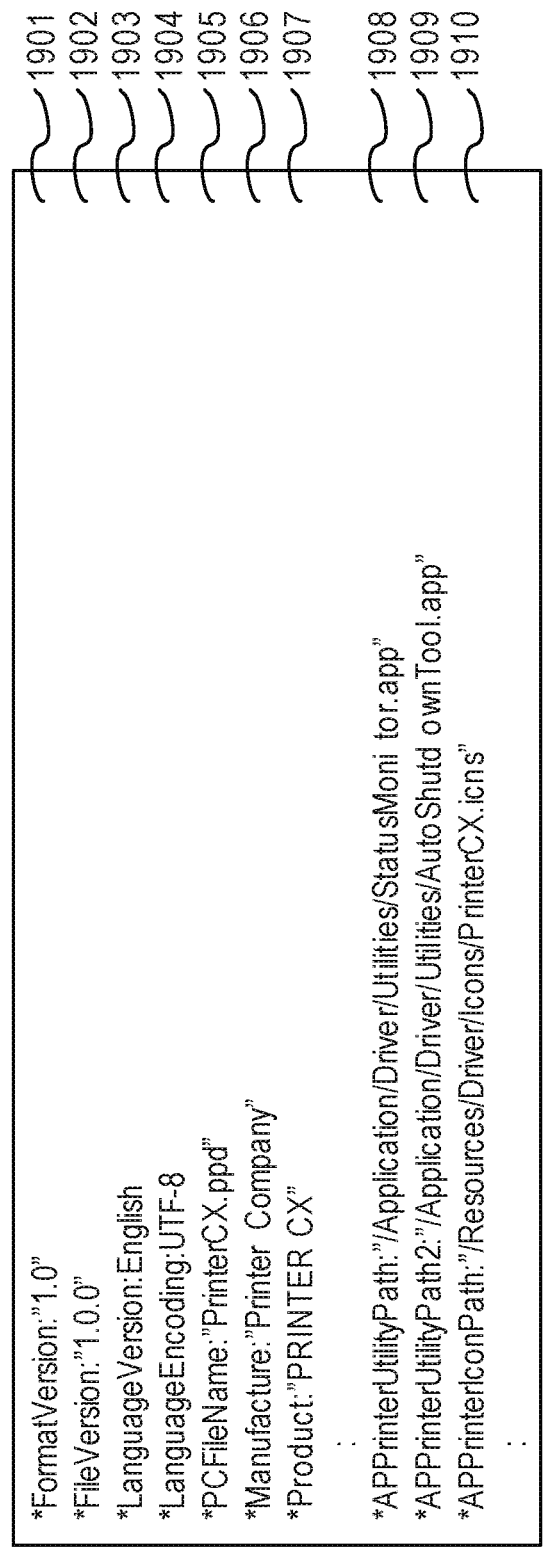
FIG. 20 is a diagram for describing an example of a PPD file according to the second embodiment.

FIG. 20 is a diagram for describing an example of the PPD file of the printer CX according to the second embodiment.

In FIG. 20, since 1901, 1902, 1903, 1904, 1905, 1906, 1907 and 1910 are the same as 1601 to 1607 and 1609 of FIG. 17A, explanation thereof will be omitted.

In the PPD file of FIG. 20, a path of the status monitor is described in "APPrinterUtilityPath" (1908). At the same time, a path of the auto-shutdown tool is described in "APPrinterUtilityPath2" (1909).

In a case where the printer to which the virtual printer is connected corresponds to two or more utilities, the PPD file including designation of the paths of the two or more utilities as illustrated in FIG. 20 is prepared. Thus, two or more activation buttons can be displayed in the area 106 of the main UI, and any of the utilities can be activated by the user.

As described above, in each of the embodiments, when the virtual printer is selected from the virtual printer list or the like, the utility corresponding to the model of the image forming apparatus to which the selected virtual printer is connected is identified, and the activation button of the identified utility is displayed on the UI screen of the virtual printer. That is, the display of the UI screen of the virtual printer is switched such that the activation button of the different utility is displayed depending on the model of the image forming apparatus to which the selected virtual printer is connected. Thus, even in the printing system that does not use the printer driver, the user can use the different utility application for each model of image forming apparatus.

Incidentally, in the above example, the case has been described in which various utilities are stored in the host computer 101 as the files related to the virtual printer service 211, for example, as illustrated in FIG. 14. However, the utility may be on a server (or cloud) with which the host computer 101 can communicate. In this case, the URL or the like of the utility arranged on the above server is described in "APPrinterUtilityPath" (1608, 1618), "APPrinterUtilityPath2" (1909), and the like.

It should be noted that the configurations and contents of the above various data are not limited to these described, and it is apparent that the various data are configured with various configurations and contents that may depend on use application and purpose.

Although the embodiment has been described above, the present disclosure can take an embodiment as, for example, a system, an apparatus, a method, a program, a storage medium, or the like. More specifically, the present disclosure may be applied to a system including a plurality of devices, or may be applied to an apparatus including a single device.

According to the present disclosure, it is possible to allow a user to use a different utility application for each model of an image forming apparatus even in a printing system that does not use a printer driver.

Besides, all constitutions and configurations obtained by combining the above embodiments also included in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-109412, filed Jun. 12, 2019, which is hereby incorporated by reference herein in its entirety.

What is claimed is:

1. A computer that has a print function for generating a first format print data, the computer comprising:
a controller including a processor and a memory storing an application, wherein the processor is configured by executing the application to perform operations including:
creating a virtual printer in the application, wherein the virtual printer is associated with a printer that does not support the first format print data,
notifying information of the virtual printer to the print function of the computer, wherein the notified information indicates that the virtual printer supports the first format print data,
obtaining status information of the printer associated with the virtual printer from the printer,
receiving a user instruction for displaying a status of the virtual printer, and
displaying the obtained status in accordance with the received user instruction.

2. The computer according to claim 1, wherein, by using a specific protocol, the print function is configured to allow printing without using a printer driver.

3. The computer according to claim 1, wherein the operations further include notifying an Internet Protocol (IP) address for virtual printer to the print function of the computer.

4. The computer according to claim 1, wherein the virtual printer is configured not to display a print setting user interface.

5. The computer according to claim 1, wherein the virtual printer is created in an application, and wherein the generated first format print data is transmitted from the print function to the virtual printer in the application stored in the memory by designating an Internet Protocol (IP) address and a port number for the virtual printer.

6. The computer according to claim 5, wherein an IP address for the virtual printer is provided from the application stored in the memory to an operating system.

7. The computer according to claim 1, wherein the operations further include:

converting the first format print data to a second format print data, and
transmitting the second format print data to the printer.

8. The computer according to claim 7, wherein the converted second format print data is transmitted from the print function to the virtual printer by designating an Internet Protocol (IP) address for the virtual printer.

9. The computer according to claim 1, wherein the operations further include:
specifying one or more functions corresponding to the printer associated with the virtual printer, and
displaying one or more objects corresponding to the one or more functions,
wherein the received user instruction is an instruction for selecting one of the one or more objects.

10. The computer according to claim 9, wherein the one or more functions are specified based on information of a model of the printer associated with the virtual printer.

11. A method for controlling a computer that has a print function for generating a first format print data, the method comprising:
creating a virtual printer in the application, wherein the virtual printer is associated with a printer that does not support the first format print data;
notifying information of the virtual printer to the print function of the computer, wherein the notified information indicates that the virtual printer supports the first format print data;
obtaining status information of the printer associated with the virtual printer from the printer;
receiving a user instruction for displaying a status of the virtual printer; and
displaying the obtained status in accordance with the received user instruction.

12. The method according to claim 11, wherein, by using a specific protocol, the print function is configured to allow printing without using a printer driver.

13. The method according to claim 11, wherein the virtual printer is configured not to display a print setting user interface.

14. The method according to claim 11, further comprising notifying an Internet Protocol (IP) address for virtual printer to the print function of the computer.

15. The method according to claim 11, wherein the virtual printer is created in an application, and wherein the generated first format print data is transmitted from the print function to the virtual printer in the application stored in the memory by designating an Internet Protocol (IP) address and a port number for the virtual printer.

16. The method according to claim 15, wherein an IP address for the virtual printer is provided from the application stored in the memory to an operating system.

17. A non-transitory computer-readable storage medium storing an application to cause a computer to perform a method for controlling a computer that has a print function for generating a first format print data, the method comprising:
creating a virtual printer in the application, wherein the virtual printer is associated with a printer that does not support the first format print data;
notifying information of the virtual printer to the print function of the computer, wherein the notified information indicates that the virtual printer supports the first format print data;
obtaining status information of the printer associated with the virtual printer from the printer;

receiving a user instruction for displaying a status of the virtual printer; and displaying the obtained status in accordance with the received user instruction.

18. The non-transitory computer-readable storage medium according to claim 17, wherein the virtual printer is created in an application, and wherein the generated first format print data is transmitted from the print function to the virtual printer in the application stored in the memory by designating an Internet Protocol (IP) address and a port number for the virtual printer.

19. The non-transitory computer-readable storage medium according to claim 18, wherein an IP address for the virtual printer is provided from the application stored in the memory to an operating system.

* * * * *